(12) United States Patent
Jebara et al.

(10) Patent No.: US 9,082,082 B2
(45) Date of Patent: Jul. 14, 2015

(54) NETWORK INFORMATION METHODS DEVICES AND SYSTEMS

(71) Applicant: The Trustees of Columbia University in the City of New York, New York, NY (US)

(72) Inventors: Tony Jebara, New York, NY (US); Bert Huang, Berwyn Heights, MD (US); Blake Shaw, New York, NY (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 99 days.

(21) Appl. No.: 13/707,478

(22) Filed: Dec. 6, 2012

(65) Prior Publication Data

US 2013/0144818 A1 Jun. 6, 2013

Related U.S. Application Data

(60) Provisional application No. 61/567,518, filed on Dec. 6, 2011.

(51) Int. Cl.
*G06N 3/08* (2006.01)
*G06N 99/00* (2010.01)
*G06Q 50/00* (2012.01)

(52) U.S. Cl.
CPC .............. *G06N 99/005* (2013.01); *G06Q 50/00* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 5,841,958 A | 11/1998 | Buss et al. | |
| 6,091,424 A | 7/2000 | Madden et al. | |
| 6,714,975 B1 | 3/2004 | Aggarwal et al. | |
| 6,952,682 B1 | 10/2005 | Wellman | |
| 7,489,638 B2 | 2/2009 | Keslassy et al. | |
| 7,733,895 B2 | 6/2010 | Kesselman et al. | |
| 7,778,247 B2 | 8/2010 | Green | |
| 7,788,260 B2 | 8/2010 | Lunt et al. | |
| 7,933,915 B2 | 4/2011 | Singh et al. | |
| 8,000,262 B2 | 8/2011 | Leighton et al. | |
| 8,078,255 B2 | 12/2011 | Bhandarkar et al. | |
| 8,150,634 B1 | 4/2012 | Constantine et al. | |
| 8,195,693 B2 | 6/2012 | Syeda-Mahmood | |
| 8,250,600 B2 | 8/2012 | Kodialam et al. | |
| 2001/0056395 A1 | 12/2001 | Khan | |

(Continued)

FOREIGN PATENT DOCUMENTS

| JP | 2006039955 A | 2/2006 |
|---|---|---|
| KR | 20070058046 A | 6/2007 |

OTHER PUBLICATIONS

Khuri, Natalia, "Operon Prediction with Bayesian Classifiers" (2007).Master's Projects. Paper 128.*

(Continued)

*Primary Examiner* — Wilbert L Starks
(74) *Attorney, Agent, or Firm* — Miles & Stockbridge P.C.; Mark A. Catan

(57) ABSTRACT

Methods and systems for predicting links in a network, such as a social network, are disclosed. The existing network structure can be used to optimize link prediction. The methods and systems can learn a distance metric and/or a degree preference function that are structure preserving to predict links for new/existing nodes based on node properties.

20 Claims, 21 Drawing Sheets

(56) References Cited

U.S. PATENT DOCUMENTS

| | | |
|---|---|---|
| 2002/0099519 A1 | 7/2002 | Srivastava |
| 2003/0140143 A1 | 7/2003 | Wolf et al. |
| 2003/0185229 A1 | 10/2003 | Shachar et al. |
| 2004/0267686 A1 | 12/2004 | Chayes et al. |
| 2005/0048456 A1 | 3/2005 | Chefd'hotel et al. |
| 2005/0226214 A1 | 10/2005 | Keslassy et al. |
| 2005/0243736 A1 | 11/2005 | Faloutsos et al. |
| 2005/0265618 A1 | 12/2005 | Jebara |
| 2006/0115267 A1 | 6/2006 | Kesselman et al. |
| 2006/0253418 A1 | 11/2006 | Charnock et al. |
| 2006/0253476 A1 | 11/2006 | Roth et al. |
| 2006/0271438 A1 | 11/2006 | Shotland et al. |
| 2007/0014247 A1 | 1/2007 | Ou et al. |
| 2007/0031003 A1 | 2/2007 | Cremers |
| 2007/0050282 A1 | 3/2007 | Chen et al. |
| 2007/0118432 A1 | 5/2007 | Vazirani et al. |
| 2007/0156617 A1 | 7/2007 | Szummer et al. |
| 2007/0185871 A1 | 8/2007 | Canright et al. |
| 2007/0239694 A1 | 10/2007 | Singh et al. |
| 2008/0027969 A1 | 1/2008 | Wen et al. |
| 2008/0052152 A1 | 2/2008 | Yufik |
| 2008/0071764 A1 | 3/2008 | Omi et al. |
| 2008/0215607 A1 | 9/2008 | Kaushansky et al. |
| 2008/0243735 A1 | 10/2008 | Rish et al. |
| 2008/0256034 A1 | 10/2008 | Chang et al. |
| 2008/0260230 A1 | 10/2008 | Gotardo et al. |
| 2008/0275861 A1 | 11/2008 | Baluja et al. |
| 2008/0275899 A1 | 11/2008 | Baluja et al. |
| 2008/0307097 A1 | 12/2008 | Sabatelli et al. |
| 2009/0022403 A1 | 1/2009 | Takamori et al. |
| 2009/0110089 A1 | 4/2009 | Green |
| 2009/0262664 A1 | 10/2009 | Leighton et al. |
| 2010/0251290 A1 | 9/2010 | Kodialam et al. |
| 2010/0257054 A1 | 10/2010 | Martin et al. |
| 2011/0040619 A1 | 2/2011 | Jebara et al. |
| 2012/0066172 A1 | 3/2012 | Jebara |

OTHER PUBLICATIONS

Silva, et al., Ranking Relations Using Analogies in Biological and Information Networks, Annals of Applied Statistics 2010, vol. 4, No. 2, pp. 615-644.*

Wikipedia, "Johnson-Lindenstrauss lemma", http://en.wikipedia.org/wiki/Johnson%E2%80%93Lindenstrauss_lemma, last downloaded Jun. 9, 2014, pp. 1-3.

J. Leskovec and E. Horvitz. Planetary-scale views on a large instant-messaging network. ACM WWW, 2008.

J. Leskovec, J Kleinberg, and C. Faloutsos. Graphs over time: densification laws, shrinking diameters and possible explanations. In Proc. of the Eleventh ACM SIGKDD International Conference on Knowledge Discovery in Data Mining, 2005.

M. Middendorf, E. Ziv, C. Adams, J. Hom, R. Koytcheff, C. Levovitz, and G. Woods. Discriminative topological features reveal biological network mechanisms. BMC Bioinformatics, 5:1471-2105, 2004.

G. Namata, H. Sharara, and L. Getoor. A survey of link mining tasks for analyzing noisy and incomplete networks. In Link Mining: Models, Algorithms, and Applications. Springer, 2010.

M. Newman. The structure and function of complex networks. Siam Review, 45:167-256, 2003.

M. Newman. Analysis of weighted networks. Phys. Rev. E, 70(5):056131, Nov. 2004.

S. Shalev-Shwartz, Y. Singer, and N. Srebro. Pegasos: Primal estimated sub-gradient solver for SVM. In Proceedings of the 24th International Conference on Machine Learning, ICML '07, pp. 807-814, New York, NY, USA, 2007. ACM.

S. Shalev-Shwartz, Y. Singer, N. Srebro, and A. Cotter. Pegasos: Primal estimated sub-gradient solver for SVM. Mathematical Programming, to appear.

A. Traud, P. Mucha, and M. Porter. Social structure of Facebook networks. CoRR, abs/1102.2166, 2011.

K. Weinberger and L. Saul. Distance metric learning for large margin nearest neighbor classification. Journal of Machine Learning Research, 10:207-244, 2009.

E. Xing, A. Ng, M. Jordan, and S. Russell. Distance metric learning with application to clustering with side-information. In S. Becker, S. Thrun, and K. Obermayer, editors, NIPS, pp. 505-512. MIT Press, 2002.

J. Xu and Y. Li. Discovering disease-genes by topological features in human protein-protein interaction network. Bioinformatics, 22(22):2800-2805, 2006.

T. Yang, R. Jin, Y. Chi, and S. Zhu. Combining link and content for community detection: a discriminative approach. In Proceedings of the 15th ACM SIGKDD international conference on Knowledge discovery and data mining, KDD '09, pp. 927-936, New York, NY, USA, 2009. ACM.

Alon, Eigenvalues and expanders, Combinatorica, 6(2): 83-96, 1986.

Alon et al., $\lambda 1$, isoperimetric inequalities for graphs, and superconcentrators, Journal of Combinatorial Theory, Series B, 8:73-88, 1985.

Ambuhl et al., Inapproximability results for sparesest cut, optimal linear arrangement and precedence constrained scheduling. In Foundations of Computer Science, 2007.

Arora, et al., Expander flows, geometric embeddings and graph partitioning. In Symposium on Theory of Computing, 2004.

Bayati et al., "Belief-Propagation for Weighted b-Matchings on Arbitrary Graphs and its Relation to Linear Programs with Integer Solutions", Technical Report, ARXIR: 0709.1190, Microsoft Research, Sep. 2007, 22 pages.

Bayati et al., Maximum weight matching via max-product belief propagation, In Proc. of the IEEE International Symposium on Information Theory, 2005.

Duan et al., Approximating maximum weight matching in near-linear time. In proceedings 51st IEEE Symposium on Foundations of Computer Science (FOCS), 2010.

http://eventseer.net/e/2936, "Call for Papers", AISTATS 2007, 2 pages.

Fremuth-Paeger et al., Balanced network flows, 1. a unifying framework for design and analysis of matching algorithms, Networks, 33(1):1-28, 1999.

Huang et al., Loopy belief propagation for bipartite maximum weight b-matching, 2007, Proceedings of the Eleventh International Conference on Artificial Intelligence and Statistics, vol. 2 of JMLR: W&CP, pp. 1-8.

Huang et al., Maximum Likelihood Graph Structure Estimation with Degree Distributions, In Analyzing Graphs: Theory and Applications, NIPS Workshop, 2008 (6 pages).

Huang et al., Exact graph structure estimation with degree priors. In M. Wani, M. Kantardzic, V. Palade, L. Kurgan, and Y. Qi, editors, ICMLA, pp. 111-118. IEEE Computer Society, 2009. ISBN 978-0-7695-3926-3.

Tommi S. Jaakkola et al., "MAP Estimation Via Agreement on Trees: Message-Passing and Linear Programming", IEEE Transactions on Information Theory, vol. 51, No. 11, Nov. 2005, XP011141509, pp. 3697-3717.

Jaakkola e al., Maximum-margin matrix factorization, in Advances in Neural Information Processing Systems 17, MIT Press, Cambridge, MA, 2004.

Jebara et al., B-matching for spectral clustering, In Proc. of the European Conference on Machine Learning, ECML, 2006.

Jebara et al., Graph Construction and b-Matching for Semi-Supervised Learning, posted on Columbia University Website May 13, 2009.

Kyomin Jung et al., "Approximate message-passing inference algorithm", Information Theory Workshop, 2007, IEEE, Sep. 2-6, 2007, XP031136599, pp. 224-229.

Marlin et al., Collaborative filtering and the missing at random assumption, in Proceedings of UAI 2007.

Marlin, B., Modeling user rating profiles for collaborative filtering. In Advances in Neural Information Processing Systems 17. MIT Press, 2004.

McDiarmid, Colin, On the method of bounded differences, Surveys in Combinatorics, p. 148188, 1989.

Morris et al., Denoising and untangling graphs using degree priors, In Advances in Neural Information Processing Systems 16, MIT Press, Cambridge, MA, 2003.

(56) References Cited

OTHER PUBLICATIONS

Pandit et al., NetProbe: A fast and Scalable System for Fraud Detection in Online Auction Networks, 2007, WWW '07 Proceedings of the 16th International Conference on World Wide Web, pp. 201-210.
Ng et al., On spectral clustering: Analysis and an algorithm, In Neural Information Processing Systems, 2001.
Sujay Sanghavi et al., "Networking Sensors Using Belief Propagation", Communication, Control, and Computing, 2008 Forty-Sixth Annual Allerton Conference, IEEE, Sep. 23-26, 2008, XP031435179, pp. 384-391.
Sujay Sanghavi et al., "Belief Propagation and LP relaxation for Weighted Matching in General Graphs", in Proceedings of NIPS, Dec. 2007, 17 pages.
Sanghavi et al., Linear programming analysis of loopy belief propagation for weighted matching, In Advances in Neural Information Processing Systems 20, pp. 1273-1280, MIT Press, Cambridge, MA, 2008.
Shi et al., Normalized Cuts and Image Segmentation, In IEEE Transactions on Pattern Analysis and Machine Intelligence, vol. 22, No. 8, Aug. 2000.
Sankowski et al., Maximum weight bipartite matching in matrix multiplication time. Theor. Comput. Sci., 410(44): 4480-4488, 2009.
Shaw et al., Minimum volume embedding. In M. Meila and X. Shen, editors, Proceedings of the 11th International Conference on Artificial Intelligence and Statistics, vol. 2 of JMLR: W&CP, Mar. 2007.
David A. Smith et al., "Dependency Parsing by Belief Propagation", Proceedings of the 2008 Conference on Empirical Methods in Natural Language Processing, Oct. 2008, XP055098477, pp. 145-156.
Spielman et al., Spectral partitioning works: Planar graphs and finite element meshes. In IEEE Symposium on Foundations of Computer Science, 1996.
Srebro et al., Weighted low rank approximations, In Proceedings of the 22nd International conference on machine learning, 2003.
Rennie et al., Fast maximum margin matrix factorization for collaborative prediction, In ICML '05: Proceedings of the 22nd international conference on machine learning, vol. 119 of ACM International Conference Proceeding Series, pp. 713-719, ACM, 2005.
Karatzoglou et al., Collaborative filtering on a budget. In Y. Teh and M. Titterington, Editors, Proceedings of the Thirteenth International Conference on Artificial Intelligence and Statistics (AISTATS), vol. 9, pp. 389-396, 2010.
Kolmogorov et al., Blossom v: a new implementation of a minimum cost perfect matching algorithm. Mathematical Programming Computation, 1:43-67, 2009. ISSN 1867-2949. URL http://dx.doi.org/10.1007/s12532-009-0002-8. 10.2007/s12532-009-0002-8.
Weiss et al., MAP Estimation, Linear Programming and Belief Propagation with Convex Free Energies, School of Computer Science and Engineering, The Hebrew University of Jerusalem, Jerusalem, Israel, Proceedings of Uncertainty in Artificial Intelligence (UAI), Jul. 19-22, 2007.
Extended European Search Report for corresponding EP Patent Application No. 10778422 dated Feb. 5, 2014.
Chinese Office Action with English translation for corresponding Chinese Patent Application No. 200980156712.X dated Jan. 13, 2014.
International Search Report for PCT/US12/32318 mailed Jul. 17, 2012.
European Extended Search Report for EP 09832595.4 mailed Dec. 5, 2013.
EPO: Notice from the European Patent Office dated Oct. 1, 2007 concerning business methods, Official Journal of the European Patent Office, vol. 30, No. 11, Nov. 1, 2007, pp. 592-593, XP007905525.
Shaw et al., Structure preserving embedding. In Proc. of the 26th International Conference on Machine Learning, (2009), pp. 1-8. ISBN 978-1-60558-516-1.
E. Airoldi, D. Blei, S. Fienberg, and E. Xing. Mixed membership stochastic blockmodels. JMLR, 9:1981-2014, 2008.
J. Chang and D. Blei. Hierarchical relational models for document networks. Annals of Applied Statistics, 4:124-150, 2010.
G. Chechik, V. Sharma, U. Shalit, and S. Bengio. Large scale online learning of image similarity through ranking. J. Mach. Learn. Res., 11:1109-1135, Mar. 2010.
J. Chen, W. Geyer, C. Dugan, M. Muller, and I. Guy. Make new friends, but keep the old: recommending people on social networking sites. In CHI, pp. 201-210. ACM, 2009.
S. Dasgupta and A. Gupta. An elementary proof of a theorem of Johnson and Lindenstrauss. Random Struct. Algorithms, 22:60-65, Jan. 2003.
B. Huang and T. Jebara. Fast b-matching via sufficient selection belief propagation. In Proceedings of the Fourteenth International Conference on Artificial Intelligence and Statistics, 2011.
T. Joachims. Training linear SVMs in linear time. In ACM SIG International Conference on Knowledge Discovery and Data Mining (KDD), pp. 217-226, 2006.
T. Joachims, T. Finley, and C. Yu. Cutting-plane training of structural SVMs. Machine Learning, 77(1):27-59, 2009.
Natwar Modani et al., "A Framework for Session Based Recommendations", K. Bauknecht et al., (Eds.): EC-Web 2005, LNCS 3590, pp. 108-117, 2005.
Jean-Yves Audibert et al., "Tuning bandit algorithms in stochastic environments", Author manuscript, published in "Algorithmic Learning Theory, Sendai: Japan (2007)".
Peter L. Bartlett et al., "Convexity, Classification, and Risk Bounds", Journal of the American Statistical Association, vol. 101, No. 473, Theory and Methods, Mar. 2006.
Roman Timofeev, "Classification and Regression Trees (CART) Theory and Applications", A Master Thesis Presented, CASE—Center of Applied Statistics and Economics, Dec. 20, 2004.
Yoav Freund et al., "A decision-theoretic generalization of on-line learning and an application to boosting", Journal of Computer and System Sciences, 55(1):119-139, 1997.
Andreas Maurer et al., "Empirical Bernstein Bounds and Sample Variance Penalization", In COLT, 2009.
Volodymyr Mnih et al., "Empirical Bernstein Stopping", In COLT, 2008.
G. Rätsch et al., "Soft Margins for AdaBoost", Machine Learning, 42, 287-320, 2001.
Lev Reyzin et al., "How Boosting the Margin Can Also Boost Classifier Complexity", In ICML, 2006.
Robert E. Schapire et al., "Boosting the Margin: A New Explanation for the Effectiveness of Voting Methods", The Annals of Statistics, 26(5): 1651-1686, 1998.
Pannagadatta K. Schivaswamy et al., "Empirical Bernstein Boosting", In AISTATS, 2010.
Olivier Bousquet et al., "Introduction to Statistical Learning Theory", Lecture Notes in Artificial Intelligence, 3176:169-207, 2004.
P. Shivaswamy and T. Jebara, "Variance Penalizing AdaBoost", Neural Information Processing Systems (NIPS), Dec. 2011.

\* cited by examiner

NETWORK INFORMATION METHODS DEVICES AND SYSTEMS

CROSS REFERENCE TO RELATED APPLICATIONS

This application claims the benefit of U.S. Provisional Application No. 61/567,518 filed Dec. 6, 2011, the content of which is hereby incorporated by reference in its entirety.

STATEMENT REGARDING FEDERALLY SPONSORED RESEARCH

The present invention was made with government support under grant numbers N66001-09-C-0080 awarded by the Department of Homeland Security (DHS) and IIS-1117631 by the National Science Foundation (NSF). The U.S. government has certain rights in the invention.

BACKGROUND

Many real-world networks are described by both connectivity information and features for every node. Many social networks are of this form; on services such as Facebook, Twitter, or LinkedIn, there are profiles which describe each person. In addition, participants communicate and transact with each other as well. Other examples such as etsy.com in which buyers find small vendors in a large framework are similar to social media. Sites such as reddit.com allow users to find links to medial or comments, providing a framework that could be improved by allowing users to find material they find most interesting. The proliferation of social networks on the web has spurred interest in the development of recommender systems to increase the value derived by participants. There exist challenges in making recommendations based on user information and their activities because people form relationships for a variety of reasons. For example, in Facebook perhaps they share similar parts of their profile such as their school or major, or perhaps they have completely different profiles. There is an on-going need for improvements in this area. In addition there are many systems, such as reddit and etsy, which provide a decent framework that are susceptible to improvement by providing a good recommendation system.

SUMMARY

Embodiments of the disclosed subject matter include systems, devices, and methods that employ existing network data including node features and structural characteristics (links) of a network, to predict desired, expected, most preferred, recommended, likelihood of new links. For example, a network of friendships, each may define a link in a population and the characteristics of the individuals such as height, preferred sport, gender, age, etc. would form a feature set. These feature sets and links may be used to train a machine learning engine that can then predict, for an individual characterized by a new feature set, one or more friendships ("links") that would be desired by him, expected to arise, most preferred by the individuals were they to befriend, recommended by the individuals, or likelihood). Essentially, the link information is used as a latent measure of the value of the pairings embodied by the pairings. In the presently disclosed subject matter, the value of the pairings may incorporate latent factors that involve pairings that are not just local to the individual pair and the features at each end of the link defined by the pair. That is, there may be latent values expressed in the extended network, the neighborhood or the entire network that should affect the prediction of a new link as they affect the existence of the link in the network used to train the machine learning prediction engine. Thus, there is information the network outside the pair that should affects a prediction engine's estimate of a desired, expected, most preferred, recommended, likelihood or value of a friendship forming between a given pair of individuals. Networks to which such a prediction may be applied are varied but could include networks of products linked with purchasers, social media sites, dating sites, Twitter, Facebook, LinkedIn, an orientation service for transferees or new students for a school, etc.

In the examples and other networks, the disclosed subject matter provides a prediction engine that applies a distance metric that is learned from one or more example networks with established links and nodes characterized by feature vectors. Systems and methods for estimating distance metrics for a network, which network is characterized by connectivity information and features for each node, are described. The systems and methods permit link prediction using both the node features and existing network connections. The method employs a structure-preserving predictor, by which it is meant that given an input network having unique nodes, a set of distance metrics between the nodes may be generated which completely preserves the structural (link) information in the network. Thus, the distance metric data can be used to reconstruct the network substantially or, depending on resource cost considerations or other factors, perfectly. The extraction of such data from an existing network is called structure preserving metric learning or SPML. The extraction of predicted links from an SPML from an existing network which include limiting to an actual degree of connectivity (i.e., connectivity of the training network is also preserved or recovered from the node feature data) is identified here as degree distribution metric learning or DDML. In DDML, in addition to learning a structure preserving distance metric, a degree prediction function is also learned that can predict the number of links a node is likely to, or should have based on node features. In a friendship network, for example, the recommender is enabled not only to measure the goodness of various possible new friendships, but also, for a given person, how many friendships should ultimately attach to a given person.

In embodiments, methods for SPML and SML/DDML combine linear constraints that require graph structure to be preserved with a Frobenius norm regularizer on a distance metric and a regularization parameter to create a semidefinite program (SDP) that learns the distance metric, which is structure preserving. Preserving graph topology may be done by enforcing linear constraints on distances between nodes. The linear structure preserving constraints for metric learning used by SPML/DDML enforce that neighbors of each node are closer than most others. Given an input network having unique nodes, SPML/DDML learns a distance metric between nodes that preserve the structural information in the network.

Methods disclosed herein can improve the efficiency of SPML/DDML by optimizing the method based on stochastic gradient descent (SGD) which removes the running-time dependency on the size of the network and allows the method to easily scale to networks of thousands of nodes and millions of edges. In addition the methods disclosed herein may be suitable for parallelization and cloud-computing implementation.

The disclosed subject matter can be used in systems for providing improved prediction of new connections to users of social networking services, including internet based services (e.g. Facebook, LinkedIn, and Twitter). The disclosed subject matter can be used in systems for providing improved link prediction for documents included in an online document collection, such as a wiki online service (e.g. Wikipedia). The disclosed subject matter can also improve related product predictions provided by online retailers to users that have viewed a product's webpage.

BRIEF DESCRIPTION OF THE DRAWINGS

Embodiments will hereinafter be described in detail below with reference to the accompanying drawings, wherein like reference numerals represent like elements. The accompanying drawings have not necessarily been drawn to scale. Where applicable, some features may not be illustrated to assist in the description of underlying features.

DETAILED DESCRIPTION OF THE DRAWINGS AND EMBODIMENTS

Figure 1A:
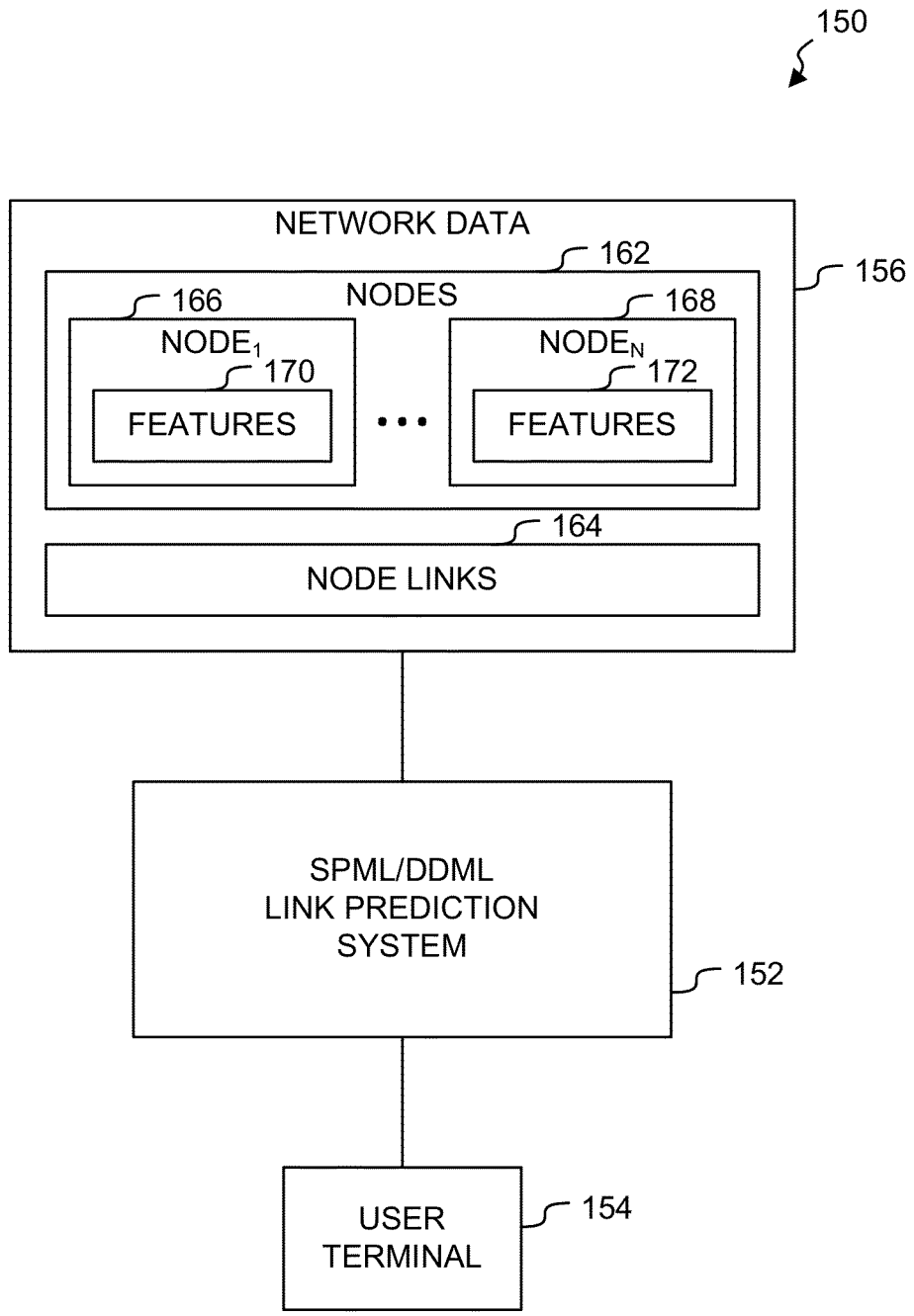
FIG. 1A is a block diagram of an exemplary embodiment of a structure preserving metric learning (SPML/DDML) link prediction system according to some embodiments of the disclosed subject matter.

Embodiments of the disclosed subject matter relate generally to methods and systems for distance-metric learning using a network described by both connectivity information and features for each node and for link prediction using node features and the learned distance metric. In embodiments a degree prediction function is also learned to predict, based on node features, the number of links a node is likely to have.

The proliferation of social networks on the web has spurred many significant advances in modeling networks. However, while many efforts have been focused on modeling networks as weighted or unweighted graphs, or constructing features from links to describe the nodes in a network, few techniques have focused on real-world network data which consists of both node features in addition to connectivity information. Many social networks are of this form; on services such as Facebook, Twitter, or LinkedIn, there are profiles which describe each person, as well as the connections they make. The relationship between a node's features and connections is often not explicit. For example, people "friend" each other on Facebook for a variety of reasons: perhaps they share similar parts of their profile such as their school or major, or perhaps they have completely different profiles. Various embodiments of the disclosed subject matter can learn the relationship between profiles and links from massive social networks such that these embodiments can better predict who is likely to connect. To model this relationship, one could simply model each link independently, where one simply learns what characteristics of two profiles imply a possible link. However, this approach ignores the structural characteristics of the links in the network. Modeling independent links likely is insufficient, and in order to better model these networks one should account for the inherent topology of the network as well as the interactions between the features of nodes. Various embodiments of the disclosed subject matter therefore perform structure preserving metric learning (SPML) and/or degree distribution metric learning (DDML), methods for learning a distance metric between nodes that preserves the structural network of data used to learn the metric.

Some known metric learning algorithms, applied to supervised learning tasks such as classification, first build a k-nearest neighbors (kNN) graph from training data with a fixed k, and then optimize a metric to generate a class label for a new point by a majority vote of nearby points. The metric is optimized based on the goal of keeping connected points with similar labels (same or similar class) close while pushing away those of different class—class impostors. Points which are connected but which belong to different classes may be pushed away. Fundamentally, these supervised methods aim to learn a distance metric such that applying a connectivity algorithm (for instance, k-nearest neighbors) under the metric will produce a graph where no point is connected to others with different class labels. In practice, these constraints are enforced with slack. Once the metric is learned, the class label for a new data point can be predicted by the majority vote of nearby points under the learned metric.

Unfortunately, some of these metric learning algorithms are not easily applied when a network is given as input instead of class labels for each point. Under such a regime, SPML and DDML learn a metric such that points connected in the network are close and points which are unconnected are more distant. Intuitively, certain features or groups of features should influence how nodes connect, and thus it should be possible to learn a mapping from features to connectivity such that the mapping respects the underlying topological structure of the network. Like some previous metric learning methods, SPML and DDML learn a metric which reconciles the input features with some auxiliary information such as class labels. In this case, instead of pushing away class impostors, SPML and DDML push away graph impostors—points which are close in terms of distance but which should remain unconnected—ultimately preserving the topology of the network. Thus SPML and DDML learn a metric where the learned distances are inherently tied to the original input connectivity.

Preserving graph topology is possible by enforcing simple linear constraints on distances between nodes. By adapting the constraints from the graph embedding technique structure preserving embedding, various embodiments of the disclosed subject matter formulate simple linear structure preserving constraints for metric learning that enforce that neighbors of each node are closer than all others. Furthermore, various embodiments of the disclosed subject matter adapt these constraints for an online setting similar to PEGASOS and OASIS, such that SPML and/or DDML can be applied to large networks by optimizing with stochastic gradient descent (SGD).

Structure Preserving Metric Learning (SPML)

Given as input an adjacency matrix $A \in \mathbb{B}^{n \times n}$ and node features $X \in \mathbb{R}^{d \times n}$, structure preserving metric learning (SPML) learns a Mahalanobis distance metric parameterized by a positive semidefinite (PSD) matrix $M \in \mathbb{R}^{d \times d}$, where $M \geq 0$. The distance between two points under the metric is defined as $$D_M(x_i, x_j) = (x_i - x_j)^T M (x_i - x_j) \tag{1}$$

When the metric given by the identity $M = I^d$, $DM(x_i, x_j)$ represents the squared Euclidean distance between the i th and j th points. Learning M is equivalent to learning a linear scaling on the input features LX where $M = L_T L$ and $L \in \mathbb{R}^{d \times d}$. SPML learns an M which is structure preserving, as defined in Definition 1. Given a connectivity algorithm G, SPML learns a metric such that applying G to the input data using the learned metric produces the input adjacency matrix exactly (G is interchangeably used herein to denote the set of feasible graphs and the algorithm used to find the optimal connectivity within the set of feasible graphs). Possible choices for G include, for example, maximum weight b-matching, k-nearest neighbors, ϵ-neighborhoods, or maximum weight spanning tree.

Definition 1: Given a graph with adjacency matrix A, a distance metric parameterized by $M \in \mathbb{R}^{d \times d}$ is structure reserving with respect to a connectivity algorithm G, if G(X, M) = A.

Preserving Graph Topology with Linear Constraints

To preserve graph topology, the same linear constraints as structure preserving embedding (SPE) are used, but they are applied to M, which parameterizes the distances between points. A useful tool for defining distances as linear constraints on M is the transformation $$D_M(x_i, x_j) = x_i^T M x_i + x_j^T M x_j - x_i^T M x_j - x_j^T M x_i \tag{2}$$

which allows linear constraints on the distances to be written as linear constraints on the M matrix. For different connectivity schemes below, linear constraints are presented which enforce graph structure preservation.

Nearest Neighbor Graphs

The k-nearest neighbor algorithm (k-nn) connects each node to the k neighbors to which the node has the shortest distance, where k is an input parameter, therefore, setting k to the true degree for each node, the distances to all disconnected nodes must be larger than the distance to the farthest connected neighbor:

$$D_M(x_i, x_j) > (1 - A_{ij}) \max_l (A_{il} D_M(x_i, x_l)), \forall i, j \tag{3}$$

Similarly, preserving an ϵ-neighborhood graph obeys linear constraints on $$M: D_M(x_i, x_j) \leq \epsilon, \forall \{i,j | A_{ij} = 1\}, \text{ and}$$

$$D_M(x_i, x_j) \geq \epsilon, \forall \{i,j | A_{ij} = 0\} \tag{4}$$

if for each node the connected distances are less than the unconnected distances (or some E), i.e., the metric obeys the above linear constraints, Definition 1 is satisfied, and thus the connectivity computed under the learned metric M is exactly A.

Maximum Weight Subgraphs

Unlike nearest neighbor algorithms, which select edges greedily for each node, maximum weight subgraph algorithms select edges from a weighted graph to produce a subgraph which has total maximal weight. Given a metric parameterized by M, let the weight between two points (i, j) be the negated pairwise distance between them:

$$Z_{ij} = -D_M(x_i, x_j) = -(x_i - x_j)^T M (x_i - x_j) \tag{6}$$

For example, maximum weight b-matching finds the maximum weight subgraph while also enforcing that every node has a fixed degree bi for each ith node. The formulation for maximum weight spanning tree is similar. Unfortunately, preserving structure for these algorithms requires enforcing many linear constraints of the form:

$$tr(Z^T A) \geq tr(Z^T \tilde{A}), \forall \tilde{A} \in G \quad (7)$$

This reveals one critical difference between structure preserving constraints of these algorithms and those of nearest-neighbor graphs: there are exponentially many linear constraints. To avoid an exponential enumeration, the most violated inequalities can be introduced sequentially using a cutting-plane approach as shown in the next section.

Algorithm Derivation

By combining the linear constraints from the previous section with a Frobenius norm (denoted $\|\cdot\|_F$) regularizer on M and regularization parameter $\lambda$, we have a simple semidefinite program (SDP) which learns an M that is structure preserving and has minimal complexity. Algorithm 1 summarizes the naive implementation of SPML when the connectivity algorithm is k-nearest neighbors, which is optimized by a standard SDP solver. For maximum weight subgraph connectivity (e.g., b-matching), a cutting-plane method can be used, iteratively finding the worst violating constraint and adding it to a working-set. The most violated constraint at each iteration can be found by computing the adjacency matrix $\tilde{A}$ that maximizes $tr(\tilde{Z}\tilde{A})$ s.t. $\tilde{A} \in G$, which can be done using various published methods. See for example, C. Fremuth-Paeger and D. Jungnickel, Balanced network flows, a unifying framework for design and analysis of matching algorithms. Networks, 33(1):1-28, 1999; B. Huang and T. Jebara, Loopy belief propagation for bipartite maximum weight b-matching, Proc. 11th Intl. Conf. on Artificial Intelligence and Statistics; and/or B. Huang and T. Jebara, Fast b-matching via sufficient selection belief propagation; Proc. of the 14$^{th}$ Intl Conf. on Artificial Intelligence and Statistics, 2011.

Each added constraint enforces that the total weight along the edges of the true graph is greater than total weight of any other graph by some margin. Algorithm 2 shows the steps for SPML with cutting-plane constraints.

---

Algorithm 1: Structure preserving metric learning with nearest neighbor constraints

---

Input: $A \in \mathbb{B}^{n \times n}$, $X \in \mathbb{R}^{d \times n}$, and parameter $\lambda$
1:    $\mathcal{K} = \{M \succeq 0, D_M(x_i, x_j) \geq (1 - A_{ij}) \max_l (A_{il} D_M(x_i, x_l)) + 1 - \xi \forall_{i,j}\}$
2:    $\tilde{M} \leftarrow \text{argmin}_{M \in \mathcal{K}} \frac{\lambda}{2} \|M\|_F^2 + \xi$ {Found via SDP}
3:    return $\tilde{M}$

---

Algorithm 2: Structure preserving metric learning with cutting-plane constraints

---

Input: $A \in \mathbb{B}^{n \times n}$, $X \in \mathbb{R}^{d \times n}$, connectivity algorithm $\mathcal{G}$, and parameters $\lambda$, $\kappa$
1:    $\mathcal{K} = \{M \succeq 0\}$
2:    repeat
3:       $\tilde{M} \leftarrow \text{argmin}_{M \in \mathcal{K}} \frac{\lambda}{2} \|M\|_F^2 + \xi$ {Found via SDP}
4:       $\tilde{Z} \leftarrow 2X^T \tilde{M} X - \text{diag}(X^T \tilde{M} X) 1^T - 1 \text{diag}(X^T \tilde{M} X)^T$
5:       $\tilde{A} \leftarrow \text{argmax}_{\tilde{A}} tr(\tilde{Z}^T \tilde{A})$ s.t. $\tilde{A} \in \mathcal{G}$ {Find worst violator}
6:       if $|tr(\tilde{Z}^T \tilde{A}) - tr(\tilde{Z}^T A)| \geq \kappa$ then
7:          add constraint to $\mathcal{K}$ : $tr(Z^T A) - tr(Z^T \tilde{A}) > 1 - \xi$
8:       end if
9:    until $|tr(\tilde{Z}^T \tilde{A}) - tr(Z^T A)| \leq \kappa$
10:    return $\tilde{M}$

---

For networks larger than a few hundred nodes or for high-dimensional features, these SDPs may not scale well. The complexity of the SDP may scale with the number of variables and constraints, yielding a worst-case time of $O(d^3 + C^3)$ where $C = O(n^2)$. By temporarily omitting the PSD requirement on M, Algorithm 2 becomes equivalent to a one-class structural support vector machine (structural SVM). Stochastic SVM algorithms have been recently developed that have convergence time with no dependence on input size. Therefore, a large-scale algorithm based on projected stochastic subgradient descent is developed. The proposed adaptation removes the dependence on n, where each iteration of the algorithm is $O(d^2)$, sampling one random constraint at a time. The optimization can be rewritten as unconstrained over an objective function with a hinge-loss on the structure preserving constraints:

$$f(M) = \frac{\lambda}{2} \|M\|_F^2 - \frac{1}{|S|} \sum_{(i,j,k) \in S} \max(D_M(x_i, x_j) - D_M(x_i, x_k) + 1.0) \quad (8)$$

Here the constraints have been written in terms of hinge-losses over triplets, each consisting of a node, its neighbor and its non-neighbor. The set of all such triplets is $S = \{(i, j, k) | A_{ij} = 1, A_{ik} = 0\}$. Using the distance transformation in Equation 1, each of the $|S|$ constraints can be written using a sparse matrix $C^{(i,j,k)}$, where $C_{jj}^{(i,j,k)} = 1, C_{ik}^{(i,j,k)} = 1, C_{ki}^{(i,j,k)} = 1, C_{ij}^{(i,j,k)} = -1, C_{ji}^{(i,j,k)} = -1, C_{kk}^{(i,j,k)} = -1$, and whose other entries are zero. By construction, sparse matrix multiplication of $C^{(i,j,k)}$ indexes the proper elements related to nodes i, j, and k, such that $tr(C^{(i,j,k)} X^T M X)$ is equal to $D_M(x_i, x_j) - D_M(x_i, x_k)$. The subgradient of f at M is then $$\nabla f = \lambda M + \frac{1}{|S|} \sum_{(i,j,k) \in S_+} X C^{(i,j,k)} X^T, \quad (9)$$

where $$S_+ = \{(i, j, k) | D_M(x_i, x_j) - D_M(x_i, x_k) + 1 > 0\} \quad (10)$$

If for all triplets this quantity is negative, there exists no unconnected neighbor of a point which is closer than a point's farthest connected neighbor—precisely the structure preserving criterion for nearest neighbor algorithms. In some embodiments this objective function is optimized via stochastic subgradient descent. These embodiments sample a batch of triplets, replacing S in the objective function with a random subset of S of size B. If a true metric is necessary, various embodiments intermittently project M onto the PSD cone. Full details about constructing the constraint matrices and minimizing the objective are shown in Algorithm 3.

Algorithm 3: Structure preserving metric learning with nearest neighbor constraints and optimization with projected stochastic subgradient descent

---

Input: $A \in \mathbb{B}^{n \times n}$, $X \in \mathbb{R}^{d \times n}$, and parameters $\lambda$, T, B
1:    $M_1 \leftarrow I_d$
2:    for t from 1 to T − 1 do
3:       $\eta_t \leftarrow \frac{1}{\lambda t}$
4:       $C \leftarrow 0_{n, n}$
5:       for b from 1 to B do
6:          $(i, j, k) \leftarrow$ Sample random triplet from $S = \{(i, j, k) | A_{ij} = 1, A_{ik} = 0\}$
7:          if $D_{M_t}(x_i, x_j) - D_{M_t}(x_i, x_k) + 1 > 0$ then
8:            $C_{jj} \leftarrow C_{jj} + 1, C_{ik} \leftarrow C_{ik} + 1, C_{ki} \leftarrow C_{ki} + 1$
9:            $C_{ij} \leftarrow C_{ij} - 1, C_{ji} \leftarrow C_{ji} - 1, C_{kk} \leftarrow C_{kk} - 1$
10:          end if -continued

```
11:    end for
12:    V_t ← XCX^T + λM_t
13:    M_{t+1} ← M_t - η_t V_t
14:    Optional: M_{t+1} ← [M_{t+1}]^+ {Project onto the PSD cone}
15:    end for
16:    return M^T
```

Analysis

In this section, analysis for the scaling behavior of SPML using SGD is provided. A significant insight is that, since Algorithm 3 regularizes with the $L_2$ norm and penalizes with hinge-loss, omitting the positive semidefinite requirement for M and vectorizing M makes the algorithm equivalent to a one-class, linear support vector machine with $O(n^3)$ input vectors. Thus, the stochastic optimization is an instance of the PEGAGOS algorithm, albeit a cleverly constructed one. The running time of PEGASOS does not depend on the input size, and instead scales with the dimensionality, the desired optimization error on the objective function $\epsilon$ and the regularization parameter $\lambda$. The optimization error $\epsilon$ is defined as the difference between the found objective value and the true optimal objective value, $f(\tilde{M}) - \min_M f(M)$.

Theorem 1: Assume that the data is bounded such that $\max_{(i,j,k) \in S} \|XC^{(i,j,k)} X^T\|_F^2 \leq R$, and $R \geq 1$. During Algorithm 3 at iteration T, with $\lambda \leq 1/4$, and batch-size $B=1$, let $$\tilde{M} = \frac{1}{T} \sum_{t=1}^{T} M_t$$

be the average M so far. Then, with probability of at least $1-\delta$, $$f(\tilde{M}) = \min_M f(M) \leq \frac{84 R^2 \ln(T/\delta)}{\lambda T}. \quad (11)$$

Consequently, the number of iterations necessary to reach an optimization error of $\epsilon$ is $$\tilde{O}\left(\frac{1}{\lambda \epsilon}\right).$$

Proof (Theorem 1): The theorem is proven by realizing that Algorithm 3 is an instance of PEGASOS without a projection step on one-class data, since Corollary 2 in [S. Shalev-Shwartz, Y. Singer, N. Srebro, and A. Cotter. Pegasos: Primal estimated sub-gradient solver for SVM. Mathematical Programming. March 2011, Volume 127, Issue 1, pp 3-30] proves this same bound for traditional SVM input, also without a projection step. The input to the SVM is the set of all d×d matrices $XC^{(i,j,k)}X^T$ for each triplet $(i, j, k) \in S$.

Note that the large size of set S plays no role in the running time; each iteration requires $O(d^2)$ work. Assuming the node feature vectors are of bounded norm, the radius of the input data R is constant with respect to n, since each is constructed using the feature vectors of three nodes. In practice, as in the PEGASOS algorithm, various embodiments use $M_T$ as the output instead of the average, as doing so may perform better on real data, but an averaging version can be implemented by storing a running sum of M matrices and dividing by T before returning.

Graph 2(b) shows the training and testing prediction performance on one of the experiments described in detail below as stochastic SPML converges. The area under the receiver operator characteristic (ROC) curve is measured, which is related to the structure preserving hinge loss, and the plot shows fast convergence and quickly diminishing returns at higher iteration counts.

Variations of SPML

While stochastic SPML does not scale with the size of the input graph, evaluating distances using a full M matrix requires $O(d^2)$ work. Thus, for high-dimensional data, one exemplary approach is to use principal component analysis or random projections to first reduce dimensionality. It has been shown that n points can be mapped into a space of dimensionality $O(\log n/\epsilon^2)$ such that distances are distorted by no more than a factor of $(1 \pm \epsilon)$. Another exemplary approach is to limit M to be nonzero only along the diagonal. Diagonalizing M reduces the amount of work to $O(d)$.

If modeling cross-feature interactions is necessary, another option for reducing the computational cost is to perform SPML using a low-rank factorization of M. In this case, all references to M can be replaced with $L^T L$, thus inducing a true metric without projection. The updated gradient with respect to L is simply $$V_t \leftarrow 2XCX^T L^T + \lambda L_t \quad (12)$$

Using a factorization also allows replacing the regularizer with the Frobenius norm of the L matrix, which is equivalent to the nuclear norm of M. Using this formulation causes the objective to no longer be convex, but seems to work well in practice. Finally, when predicting links of new nodes, SPML does not know how many connections to predict. To address this uncertainty, a variant to SPML called degree distributional metric learning (DDML) can be used, which simultaneously learns the metric as well as parameters for the connectivity algorithm. Details on DDML and low-rank SPML are discussed below.

Degree Distributional Metric Learning (DDML)

While SPML using k-nearest neighbors learns a structure preserving metric, one of its limitations is in predicting full graphs in an out-of-sample setting. On training data, the degree of each node is known, so the connectivity algorithm connects the exact number of neighbors as necessary to reconstruct the input graph. On a new set of nodes, however, the target degree is unknown. One method to address this is to learn a non-stationary degree preference function over node features that relates the features of a node to its target degree.

As one possible variant to structure preserving metric learning (SPML), degree distributional metric learning (DDML) simultaneously and/or concurrently learns a metric while also learning a parameterized, non-stationary degree preference function used to compute the connectivity of nodes. This extension can be understood as SPML with an adaptive connectivity algorithm, rather than the default k-nearest neighbors.

The connectivity algorithm uses a degree preference function g, which takes a node's feature vector x and a target degree k, and is parameterized by matrix $S \in \mathbb{R}^{d \times n}$. The score is then computed via $$g(k \mid x; S) = \sum_{k'=1}^{k} x^T s_{k'}. \quad (13)$$

The score of a graph A is then the sum of all edge distances and the degree preference functions for each node $$F(A \mid X; M, S) = \sum_{ij} A_{ij} D_M(x_i, x_j) - \sum_{j} g\left(\sum_{j} A_{ij} \mid x_i; S\right). \quad (14)$$

The objective for DDML is otherwise analogous to that of SPML:

$$f(M) = \frac{\lambda}{2} \|M\|^2 - \sum_{\tilde{A} \in \mathbb{B}^{n \times n}} \max(F(A \mid X; M, S) - F(\tilde{A} \mid X; M, S) + \Delta(A, \tilde{A}), 0), \quad (15)$$

where Δ denotes Hamming distance. In some embodiments, this objective is solvable via the cutting-plane style optimization by iteratively finding the worst-violating Ã and adding it to a constraint set. For concave degree preference functions, the worst-violated constraint can be found by converting the problem to a maximum weight b-matching on an augmented graph, thus an additional concavity constraint on g is added to the optimization.

In various embodiments, a similar approach to the stochastic SPML algorithm is also possible to perform DDML much faster, and, by parameterizing the degree preference function only up to a fixed maximum degree, also eliminates the dependence of the running time on the size of the graph. As in stochastic SPML, a DDML objective can be written in terms of triplets of nodes i, neighbor j, disconnected node triplets k. Let $A^{(i,j,k)}$ denote the false graph produced by toggling the edge between nodes i and j and the edge between nodes i and k. The DDML objective using the triplet-style constraints is $$f^{deg}(M) = \frac{\lambda}{2} \|M\|^2 - \frac{1}{|S|} \sum_{(i,j,k) \in S} \max(F(A \mid X; M, S) - F(A^{(i,j,k)} \mid X; M, S) + 1, 0). \quad (16)$$

The difference in scores decomposes into four scalar values, since the only differences changing A to $A^{(i,j,k)}$ are that $A^{(i,j,k)}$ is missing edge (i,j), gains edge (i, k), the degree of node j decreases by one and the degree of node k increases by one. Thus, the difference can be computed by evaluating the distance from node i to node j, the distance from node i to node k, the change in degree preference score from the degree of node j to its degree minus one, and the change in degree preference from the degree of node k from its degree plus one. Let the degrees of all nodes be stored in array c, such that the degree of node j is c[j]. The difference is then computable as $$F(A|X;M,S) - F(A^{(i,j,k)}|X;M,S) = D_M(x_i, x_j) - D_M(x_i, x_k) + x_j^T s_{(c[j]-1)} - x_k^T s_{(c[k]+1)}. \quad (17)$$

This formulation eliminates the need for the expensive separation oracle and allows stochastic optimization. The gradient update for the metric parameter M is the same as in SPML. The gradient with respect to $s_{(c[j]-1)}$ is $x_j$ and the gradient with respect to $s_{(c[k]+1)}$ is $(-X_k)$.

To retain coherence between the different degree functions, a requirement that the resulting degree preference function for each node is concave can be added. In some embodiments concavity is enforced by stochastically sampling a node i per iteration, and projecting S such that entries in $x_i^T S$ are in decreasing order. The pseudocode for stochastic DDML is in Algorithm 4.

---

Algorithm 4 Stochastic degree distributional metric learning

Input: $A \in \mathbb{B}^{n \times n}, X \in \mathbb{R}^{d \times n}$, and parameters λ, T, B
1:  $M_1 \leftarrow I_d, S_1 \leftarrow 0_{d, n}$
2:  Compute degree array c s.t. $c[i] = \Sigma_j A_{ij}, \forall i$
3:  for t from 1 to T − 1 do
4:      $\eta_t \leftarrow \frac{1}{\lambda t}$
5:      $C \leftarrow 0_{n, n}$
6:      $S' \leftarrow \lambda S$
7:      for b from 1 to B do
8:          (i, j, k) ← Sample random triplet from $S = \{(i, j, k) \mid A_{ij} = 1, A_{ik} = 0\}$
9:          if $F(A|X; M_t, S_t) - F(A^{(i,j,k)}|X; M_t, S_t) + 1 > 0$ then
10:             $C_{jj} \leftarrow C_{jj} + 1, C_{ik} \leftarrow C_{ik} + 1, C_{ki} \leftarrow C_{ki} + 1$
11:             $C_{ij} \leftarrow C_{ij} - 1, C_{ji} \leftarrow C_{ji} - 1, C_{kk} \leftarrow C_{kk} - 1$
12:             $s_{c[j]}' \leftarrow s_{c[j]}' + x_j$
13:             $s_{c[k]}' \leftarrow s_{c[k]}' - x_k$
14:         end if
15:     end for
16:     $\nabla_t \leftarrow XCX^T + \lambda M_t$
17:     $M_{t+1} \leftarrow M_t - \eta_t \nabla_t$
18:     $S_{t+1} \leftarrow S_t - \eta_t S'$
19:     i ← Sample random index
20:     Project S so $x_i^T S$ is monotonically nonincreasing
21:     Optional: $M_{t+1} \leftarrow [M_{t+1}]^+$ {Project onto the PSD cone}
22: end for
23: return $M_T$

---

Low-Rank Structure Preserving Metric Learning

The low-rank variant of SPML computes all distances using a factorization $L \in \mathbb{R}^{r \times d}$ of $M = L^T L$, eliminating the need to compute a d×d matrix. Some existing metric learning algorithms use similar low-rank factorizations. Low-rank SPML has an additional parameter r, which limits the rank of M by explicitly determining the size of L. The optional projection onto the PSD cone is no longer necessary because $L^T L$ always forms a valid metric by construction. This optimization is not convex, but initial experimental results seem to show that the stochastic optimization avoids local minima in practice. Algorithm 5 details the steps of low-rank SPML.

Algorithm 5 Low-rank structure preserving metric learning with nearest neighbor constraints and optimization with projected stochastic subgradient descent

---

Input: $A \in \mathbb{B}^{n \times n}, X \in \mathbb{R}^{d \times n}$, and parameters λ, T, B, r
1:  $L_1 \leftarrow$ rand(r, d) {Initialize L}
2:  for t from 1 to T − 1 do
3:      $\eta_t \leftarrow \frac{1}{\lambda t}$
4:      $C \leftarrow 0_{n, n}$
5:      for b from 1 to B do
6:          (i, j, k) ← Sample random triplet from $S = \{(i, j, k) \mid A_{ij} = 1, A_{ik} = 0\}$
7:          if $\|L_t x_i - L_t x_j\|^2 - \|L_t x_i - L_t x_k\|^2 + 1 > 0$ then
8:              $C_{jj} \leftarrow C_{jj} + 1, C_{ik} \leftarrow C_{ik} + 1, C_{ki} \leftarrow C_{ki} + 1$
9:              $C_{ij} \leftarrow C_{ij} - 1, C_{ji} \leftarrow C_{ji} - 1, C_{kk} \leftarrow C_{kk} - 1$
10:         end if
11:     end for
12:     $\nabla_t \leftarrow 2XCX^T L_t^T + \lambda L_t$ 13: $L_{t+1} \leftarrow L_t - \eta_t \nabla_t$
14: end for
15: return $L_T$

SPML Experiments

A variety of synthetic and real-world experiments are described below that elucidate the behavior of SPML. SPML performance is shown on a simple synthetic dataset that is easily visualized in two dimensions and which we believe mimics many traditional network datasets. Favorable performance for SPML is also shown in predicting links of the Wikipedia document network and the Facebook social network.

Synthetic Example

To better understand the behavior of SPML, consider the following synthetic experiment. First n points are sampled from a d-dimensional uniform distribution. These vectors represent the true features for the n nodes $X \in \mathbb{R}^{d \times n}$. An adjacency matrix is computed by performing a minimum-distance b-matching on X. Next, the true features are scrambled by applying a random linear transformation: RX where $R \in \mathbb{R}^{d \times d}$. Given RX and A, the goal of SPML is to learn a metric M that undoes the linear scrambling, so that when b-matching is applied to RX using the learned distance metric, it produces the input adjacency matrix.

Figure 18:
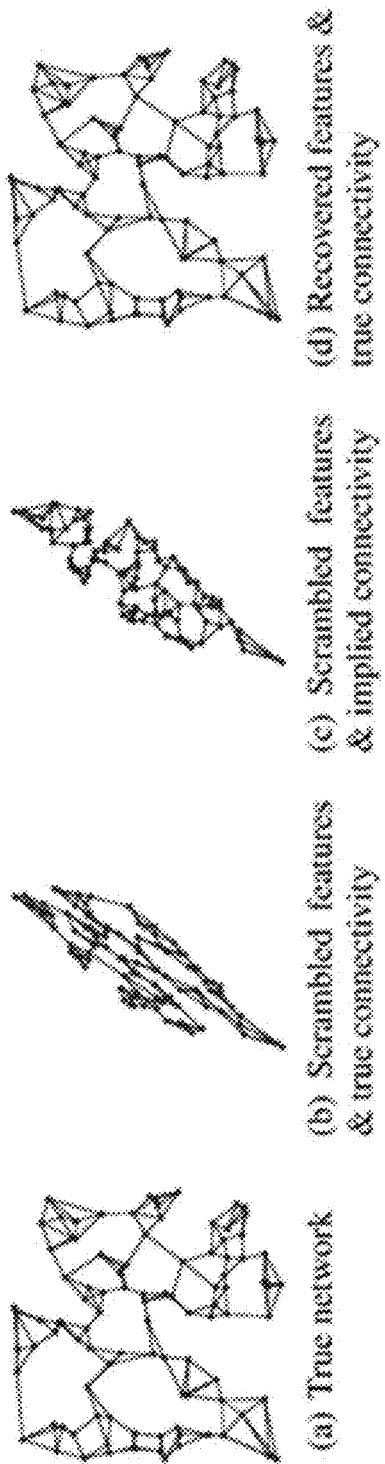
FIG. 18 illustrates synthetic SPML experiment results.

FIG. 18 illustrates the results of the above experiment for d=2, n=50, and b=4. In FIG. 18(a), we see an embedding of the graph using the true features for each node as coordinates, and connectivity generated from b-matching. In FIG. 18(b), the random linear transformation has been applied. We posit that many real-world datasets resemble plot 1(b), with seemingly incongruous feature and connectivity information. Applying b-matching to the scrambled data produces connections shown in FIG. 18(c). Finally, by learning M via SPML (Algorithm 2) and computing L by Cholesky decomposition of M, features LRX can be recovered (FIG. 18(d)) that respect the structure in the target adjacency matrix and thus more closely resemble the true features used to generate the data.

FIG. 18 illustrates that in this synthetic experiment, SPML finds a metric that inverts the random transformation applied to the features (b), such that under the learned metric (d) the implied connectivity is identical to the original connectivity (a) as opposed to inducing a different connectivity (c).

Link Prediction

SPML can be compared to a variety of methods for predicting links from node features: Euclidean distances, relational topic models (RTM), and traditional support vector machines (SVM). A simple baseline for comparison is how well the Euclidean distance metric performs at ranking possible connections. Relational topic models learn a link probability function in addition to latent topic mixtures describing each node. For the SVM, training examples are constructed consisting of the pairwise differences between node features. Training examples are labeled positive if there exists an edge between the corresponding pair of nodes, and negative if there is no edge. Because there are potentially $O(n^2)$ possible examples, and the graphs are sparse, we subsample the negative examples so that we include a randomly chosen equal number of negative examples as positive edges. Without subsampling, the SVM is unable to run the experiments in a reasonable time. The SVMPerf implementation for SVM in T. Joachims. Training linear SVMs in linear time. In ACM SIG International Conference On Knowledge Discovery and Data Mining (KDD), pages 217-226, 2006, and the authors' code for RTM in J. Chang and D. Blei. Hierarchical relational models for document networks. Annals of Applied Statistics, 4:124-150, 2010 were used.

Interestingly, an SVM with these inputs can be interpreted as an instance of SPML using diagonal M and the f-neighborhood connectivity algorithm, which connects points based on their distance, completely independently of the rest of the graph structure. Therefore, SPML is expected to product better performance in cases where the structure is important. The RTM approach may be appropriate for data that consists of counts, and is a generative model which recovers a set of topics in addition to link predictions. Despite the generality of the model, RTM does not seem to perform as well as discriminative methods in our experiments, especially in the Facebook experiment where the data is quite different from bag-of-words features. For SPML, the stochastic algorithm is run with batch size 10. The PSD projection step is skipped, since these experiments are only concerned with prediction, and obtaining a true metric is not necessary. SPML is implemented in MATLAB and requires only a few minutes to converge for each of the experiments below.

Figure 19:
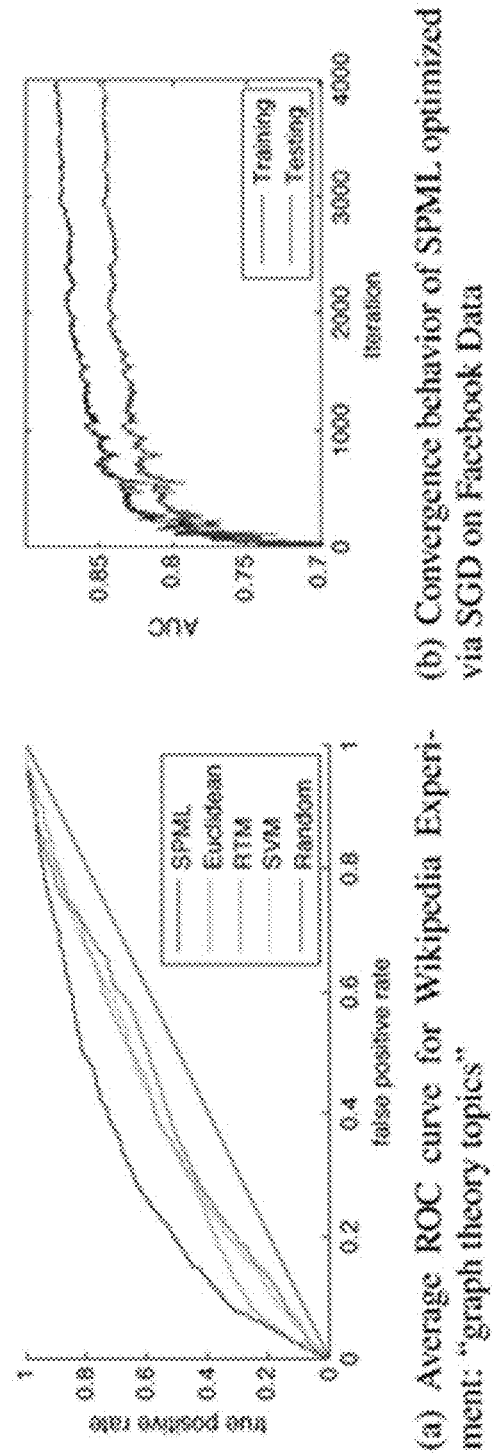
FIG. 19 illustrates Wikipedia and Facebook experiment results.

FIG. 19 illustrates the average ROC performance for the "graph theory topics" Wikipedia experiment (left) shows a strong lift for SPML over competing methods. We see that SPML converges quickly with diminishing returns after many iterations (right).

Wikipedia Articles

SPML is applied to predicting links on Wikipedia pages. Imagine the scenario where an author writes a new Wikipedia entry and then, by analyzing the word counts on the newly written page, a prediction system is able to suggest which other Wikipedia pages it should link to. First, a few subnetworks are created consisting of all the pages in a given category, their bag-of-words features, and their connections. Three categories are chosen: "graph theory topics", "philosophy concepts", and "search engines". A word dictionary of common words is used with stop-words removed. For each network, the data is split 80/20 for training and testing, where 20% of the nodes are held out for evaluation. On the remaining 80% the test cross-validates (five folds) over the parameters for each algorithm (RTM, SVM, SPML), and trains a model using the best-scoring regularization parameter. For SPML, the diagonal variant of Algorithm 3 is used, since the high-dimensionality of the input features reduces the benefit of cross-feature weights. On the held-out nodes, each algorithm is tasked to rank the unknown edges according to distance (or another measure of link likelihood), and compare the accuracy of the rankings using receiver operator characteristic (ROC) curves. Table 1 lists the statistics of each category and the average area under the curve (AUC) over three train/test splits for each algorithm. A ROC curve for the "graph theory" category is shown in FIG. 19(a). For "graph theory" and "search engines", SPML provides a distinct advantage over other methods, while no method has a particular advantage on "philosophy concepts". One possible explanation for why the SVM is unable to gain performance over Euclidean distance is that the wide range of degrees for nodes in these graphs may make it difficult to find a single threshold that separates edges from non-edges. In particular, the "search engines" category had an extremely skewed degree distribution, and is where SPML shows the greatest improvement.

SPML is also applied to a larger subset of the Wikipedia network, by collecting word counts and connections of 100,000 articles in a breadth-first search rooted at the article "Philosophy". The experimental setup is the same as previous experiments, but a 0.5% sample of the nodes is used for testing. The final training algorithm ran for 50,000 iterations, taking approximately ten minutes on a desktop computer. The resulting AUC on the edges of the held-out nodes is listed in Table 1 as the "Philosophy Crawl" dataset. The SVM and RTM do not scale to data of this size, whereas SPML offers a clear advantage over using Euclidean distance for predicting links.

Facebook Social Networks

Applying SPML to social network data allows prediction systems to more accurately predict who will become friends based on the profile information for those users. The Facebook data used includes a small subset of anonymized profile information for each student of a university, as well as friendship information. The profile information consists of gender, status (meaning student, staff, or faculty), dorm, major, and class year. Similarly to the Wikipedia experiments in the previous section, SPML is compared to Euclidean, RTM, and SVM. For SPML, a full M is learned via Algorithm 3. For each person, a sparse feature vector is constructed where there is one feature corresponding to every possible dorm, major, etc. for each feature type. Only people who have indicated all five feature types on their profiles are selected. Table 1 shows details of the Facebook networks for the four schools we consider: Harvard, MIT, Stanford, and Columbia. A separate experiment is performed for each school, randomly splitting the data 80/20 for training and testing. The training data is used to select parameters via five-fold cross validation, and train a model. The AUC performance on the held-out edges is also listed in Table 1. It is clear from the quantitative results that structural information is contributing to higher performance for SPML as compared to other methods.

tant features. A possible explanation for this difference is that MIT is the only school in the list that makes it easy for students to stay in a residence for all four years of their undergraduate program, and therefore which dorm one lives in may affect more strongly the people they connect to.

These SPML experiments demonstrate a fast convex optimization for learning a distance metric from a network such that the distances are tied to the network's inherent topological structure. The structure preserving distance metrics introduced in this article allow us to better model and predict the behavior of large real-world networks. Furthermore, these metrics are as lightweight as independent pairwise models, but capture structural dependency from features making them easy to use in practice for link-prediction. SPML's lack of dependence on graph size can be used to learn a structure preserving metric on massive-scale graphs, e.g., the entire Wikipedia site. Since each iteration requires only sampling a random node, following a link to a neighbor, and sampling a non-neighbor, this can all be done in an online fashion as the algorithm crawls a network such as the worldwide web, learning a metric that may gradually change over time.

DDML Experiments

Using DDML on the same Wikipedia experiments described above, DDML scores comparable AUC to SPML. On "graph theory", "philosophy concepts", and "search engines", DDML scores AUCs of 0.691, 0.746, and 0.725. While these scores are quite close to those of SPML, the DDML variant provides a tradeoff between running time and model richness. In the case of the Wikipedia category "philosophy concepts", DDML even provides a performance improvement, which may indicate a clear signal in degree preference learnable from the word counts.

Figure 21:
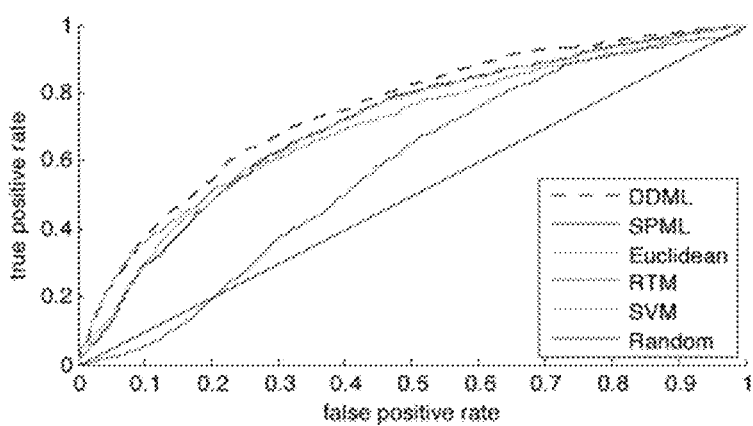
FIG. 21 illustrates a ROC curve for various algorithms on the "philosophy concepts" category.

FIG. 21 illustrates a ROC curve for various algorithms on the "philosophy concepts" category.

Low Rank SPML Experiments

Low-rank SPML is run on the Harvard Facebook data, fixing $\lambda=1e-5$ and varying the rank parameter r. The ROC

TABLE 1

Wikipedia (top), Facebook (bottom) dataset and experiment information. Shown below: number of nodes n, number of edges m, dimensionality d, and AUC performance.

| | n | m | d | Euclidean | RTM | SVM | SPML |
|---|---|---|---|---|---|---|---|
| Graph Theory | 223 | 917 | 6695 | 0.624 | 0.591 | 0.610 | 0.722 |
| Philosophy Concepts | 303 | 921 | 6695 | 0.705 | 0.571 | 0.708 | 0.707 |
| Search Engines | 269 | 332 | 6695 | 0.662 | 0.487 | 0.611 | 0.742 |
| Philosophy Crawl | 100,000 | 4,489,166 | 7702 | 0.547 | — | — | 0.601 |
| Harvard | 1937 | 48,980 | 193 | 0.764 | 0.562 | 0.839 | 0.854 |
| MIT | 2128 | 95,322 | 173 | 0.702 | 0.494 | 0.784 | 0.801 |
| Stanford | 3014 | 147,516 | 270 | 0.718 | 0.532 | 0.784 | 0.808 |
| Columbia | 3050 | 118,838 | 251 | 0.717 | 0.519 | 0.796 | 0.818 |

Figure 20:
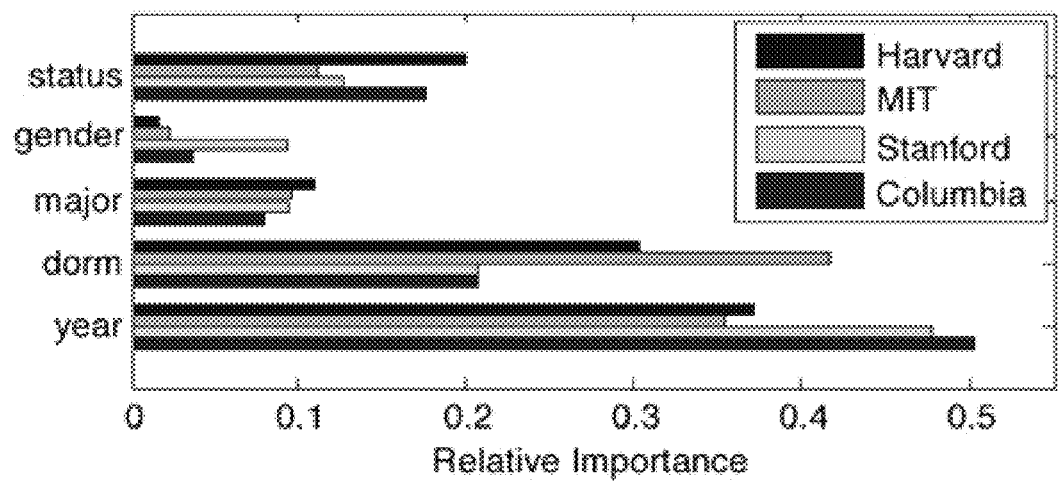
FIG. 20 provides a comparison of Facebook social networks from four schools in terms of feature importance computed from the learned structure preserving metric.

FIG. 20 provides a comparison of Facebook social networks from four schools in terms of feature importance computed from the learned structure preserving metric.

By looking at the weight of the diagonal values in M normalized by the total weight, it can be determined which feature differences are most important for determining connectivity. FIG. 20 shows the normalized weights averaged by feature types for Facebook data. FIG. 20 shows the feature types compared across four schools. For all schools except MIT, the graduating year is most important for determining distance between people. For MIT, dorms are the most important features.

curves and AUC scores using training data for different ranks are in Graph 5. With greater rank, SPML has more flexibility to construct a metric that fits the training data, but lower rank provides a tradeoff between efficiency and reconstruction quality. It is clear from this dataset that a rank of r=5 is sufficient to represent the structure preserving metric, while reducing the number of parameters from $d^2=37,249$ to $d \times r=965$. Training fewer parameters requires less time, and allows low-rank SPML to handle large-scale networks with many nodes and high-dimensional features.

Figure 22:
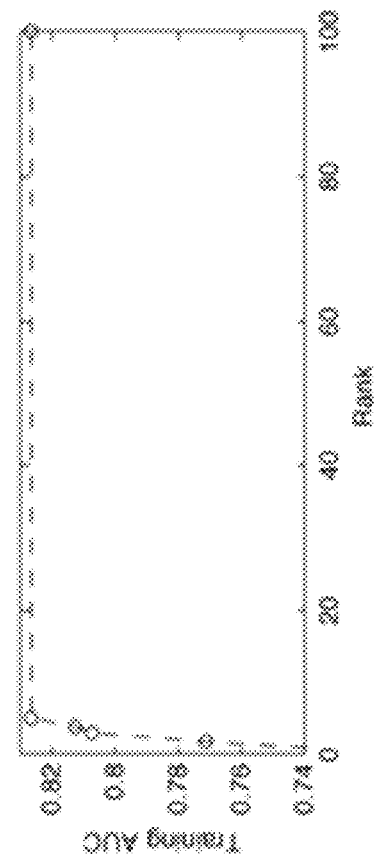
FIG. 22 illustrates the performance of low-rank SPML on training data varying the rank parameter, run on a single Facebook school.
Figure 22:
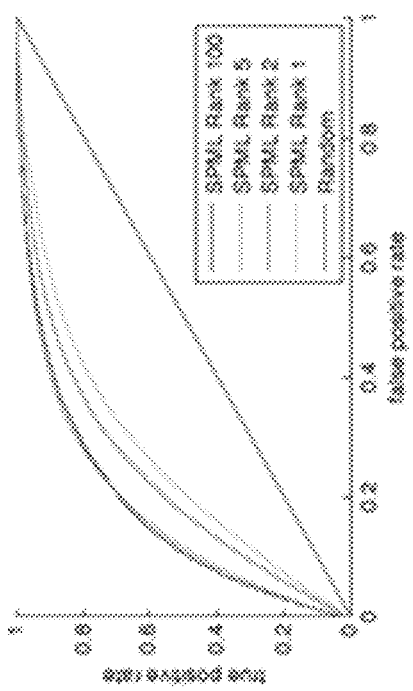

FIG. 22 illustrates the performance of low-rank SPML on training data varying the rank parameter, run on a single Facebook school. The results imply that a significantly smaller rank than the true feature dimensionality is sufficient to fit the training data.

In summary, DDML is an extension of SPML that learns degree preference functions, which are used in addition to the learned distances to predict a graph. DDML aims to learn a richer model than SPML, yet uses a comparable learning algorithm which also can learn from large-scale input.

FIG. 1A is a block diagram of an exemplary embodiment of a network system 150 with an SPML/DDML link prediction system 152 according to some embodiments of the disclosed subject matter. System 150 can include an SPML/DDML link prediction system 152 and network data 156. The network data 156 can include a plurality of nodes 166 and 188, each of which can include features (or properties) 170 and 172, and node links/connections 164. The SPML/DDML link prediction system 152 can receive data from and transmit data to a user terminal 154.

In operation, the SPML/DDML link recommender component 152 can receive link prediction requests from and transmit link predictions to the user terminal 154 according to the processes shown in FIGS. 1B and 2-7.

It will be appreciated that the network data 156 can be stored in a database system connected to the SPML/DDML link prediction system 152 via a network. Optionally, the network data 156 can be stored locally in memory attached to the prediction processing component 152.

Figure 1B:
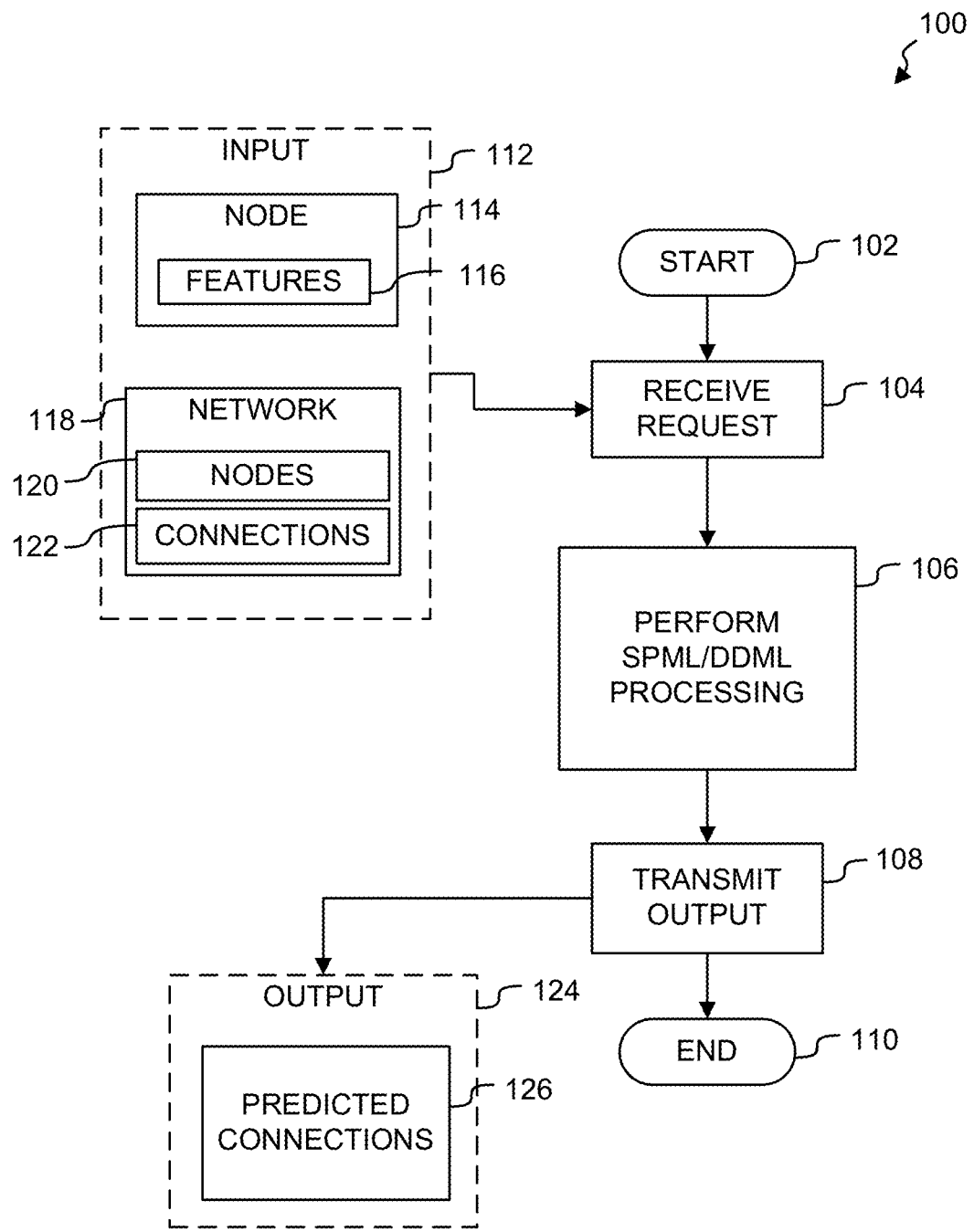
FIG. 1B is a flowchart showing an exemplary embodiment of a structure preserving metric learning (SPML/DDML) link prediction method according to some embodiments of the disclosed subject matter.

FIG. 1B is a flowchart showing an exemplary method for using structure preserving metric learning (SPML) connection prediction in a network recommender process. Processing begins at 102 and continued to 104.

Figure 9:
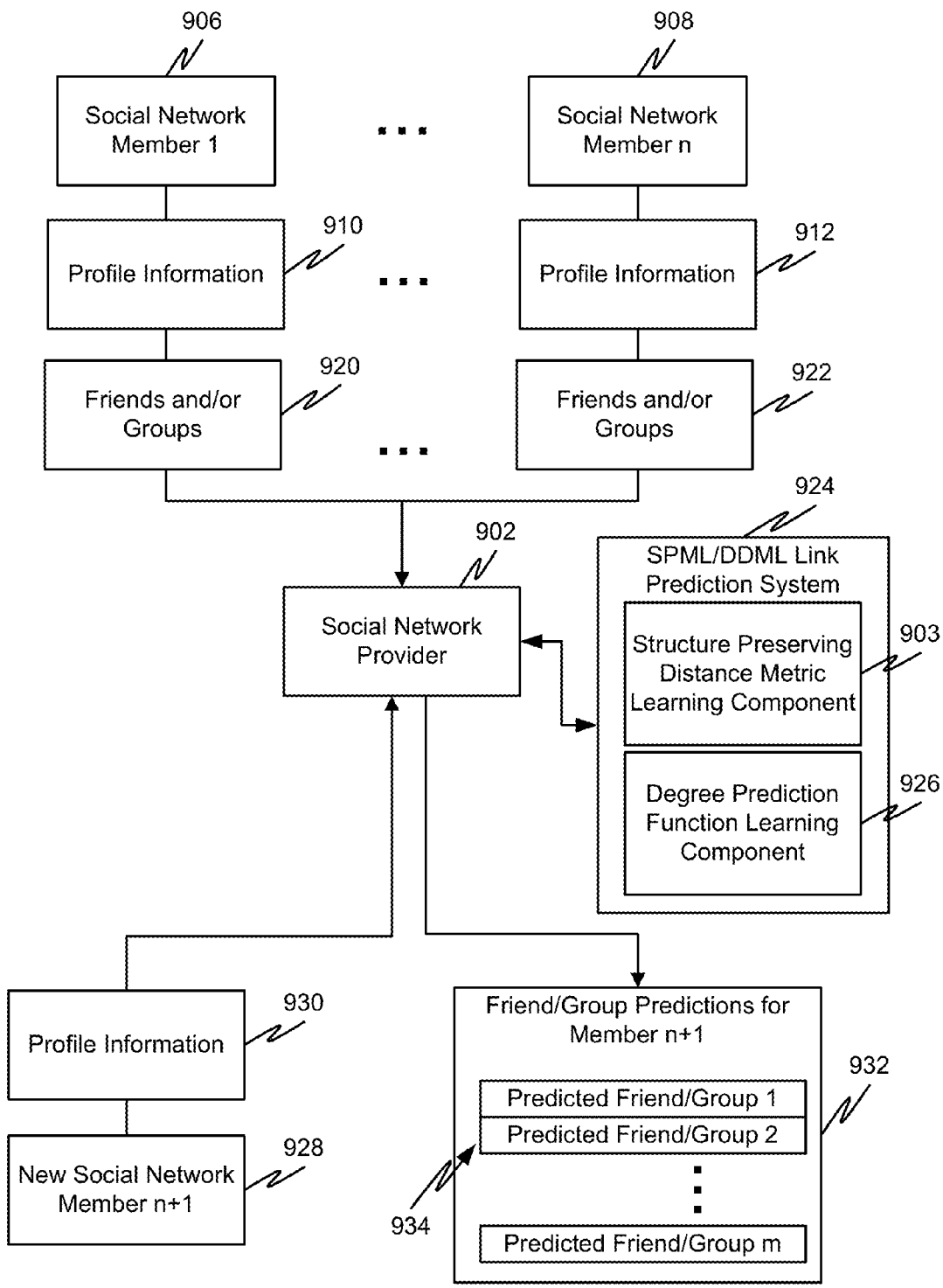
FIG. 9 is a block diagram of a system for predicting friendships to new users of a social network using SPML/DDML according to some embodiments of the disclosed subject matter.
Figure 10:
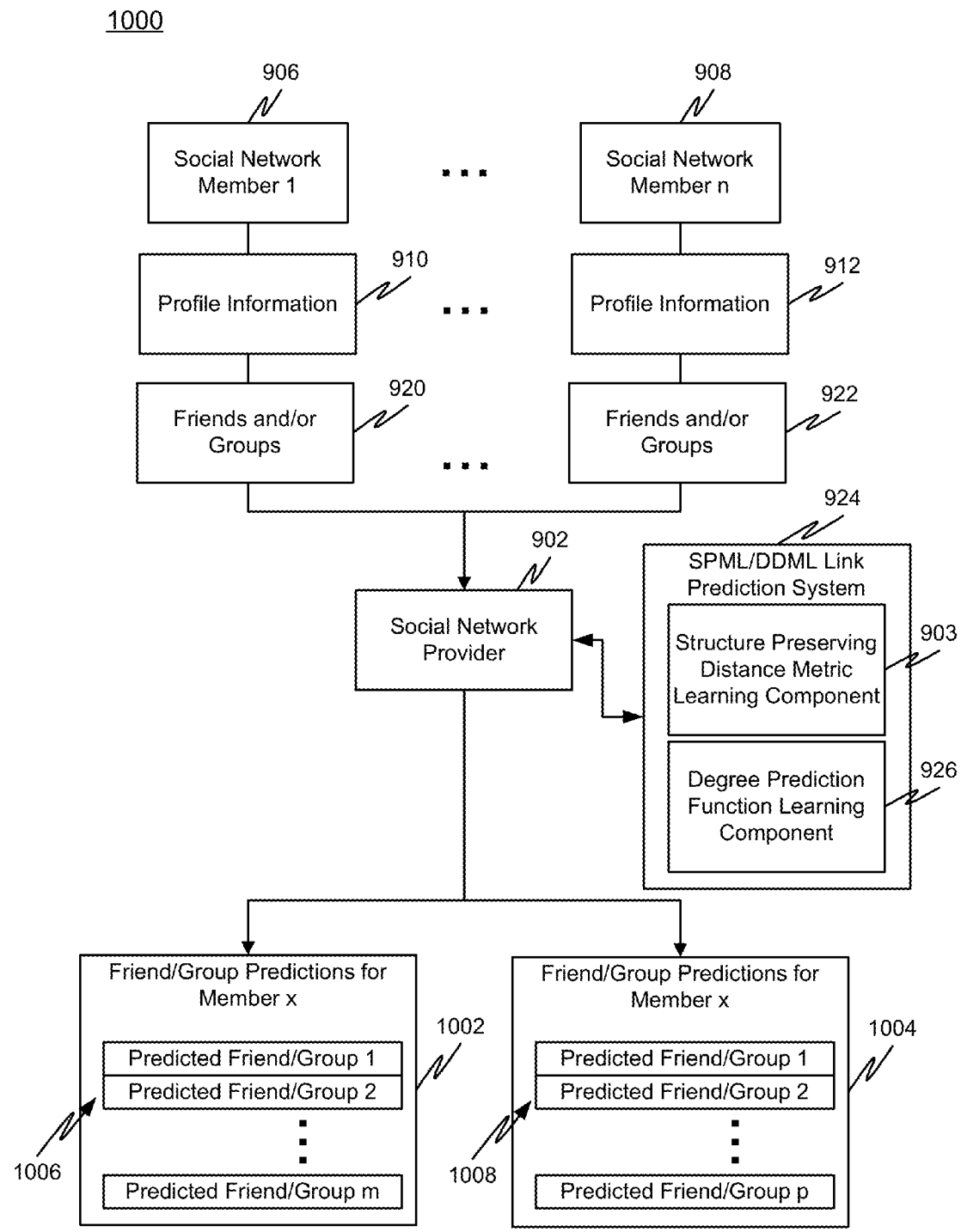
FIG. 10 is a block diagram of a system for predicting friendships between users of a social network using SPML/DDML according to some embodiments of the disclosed subject matter.
Figure 11:
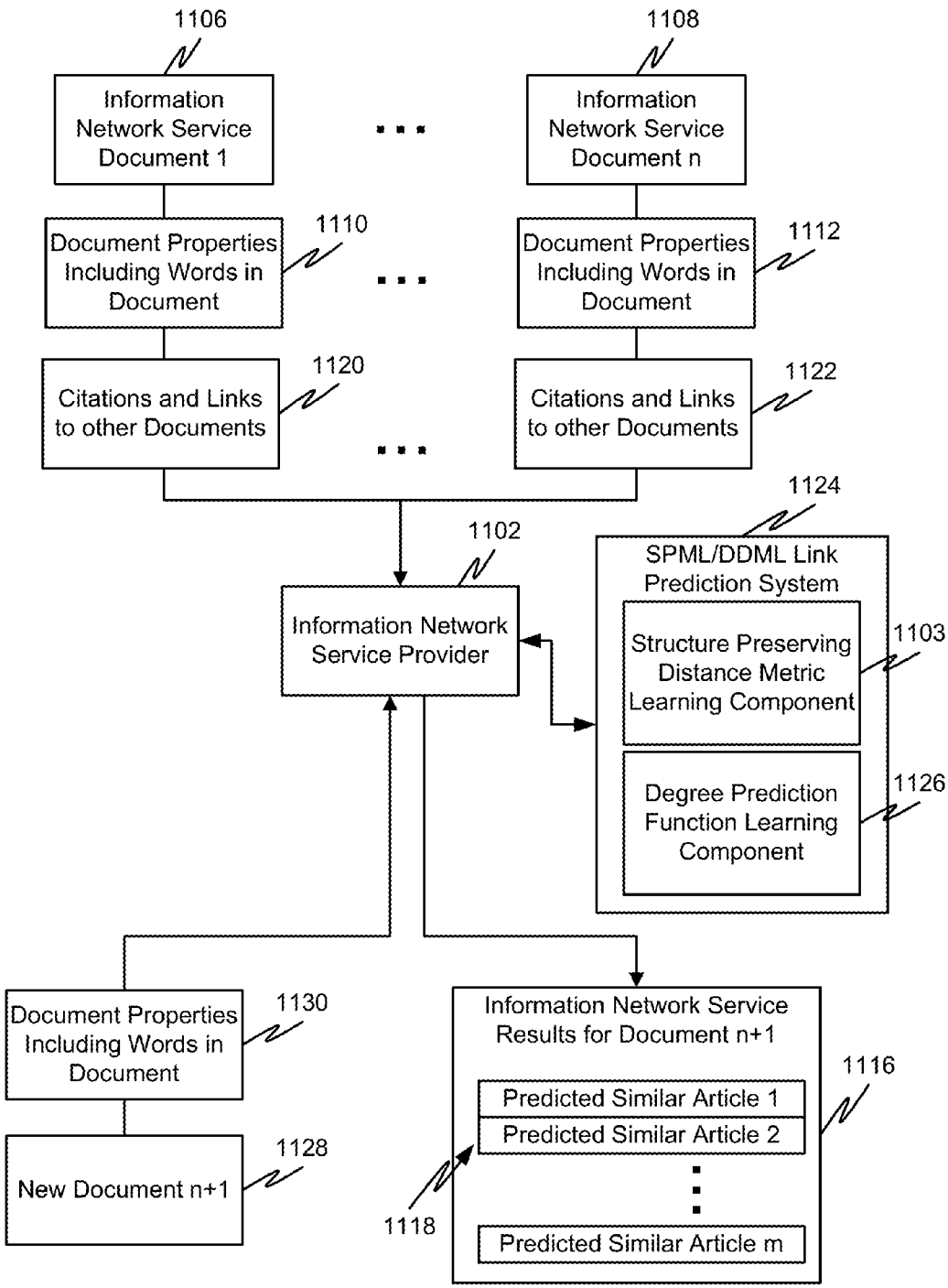
FIG. 11 is a block diagram of a system for predicting links to new documents added to an information network using SPML/DDML according to some embodiments of the disclosed subject matter.
Figure 12:
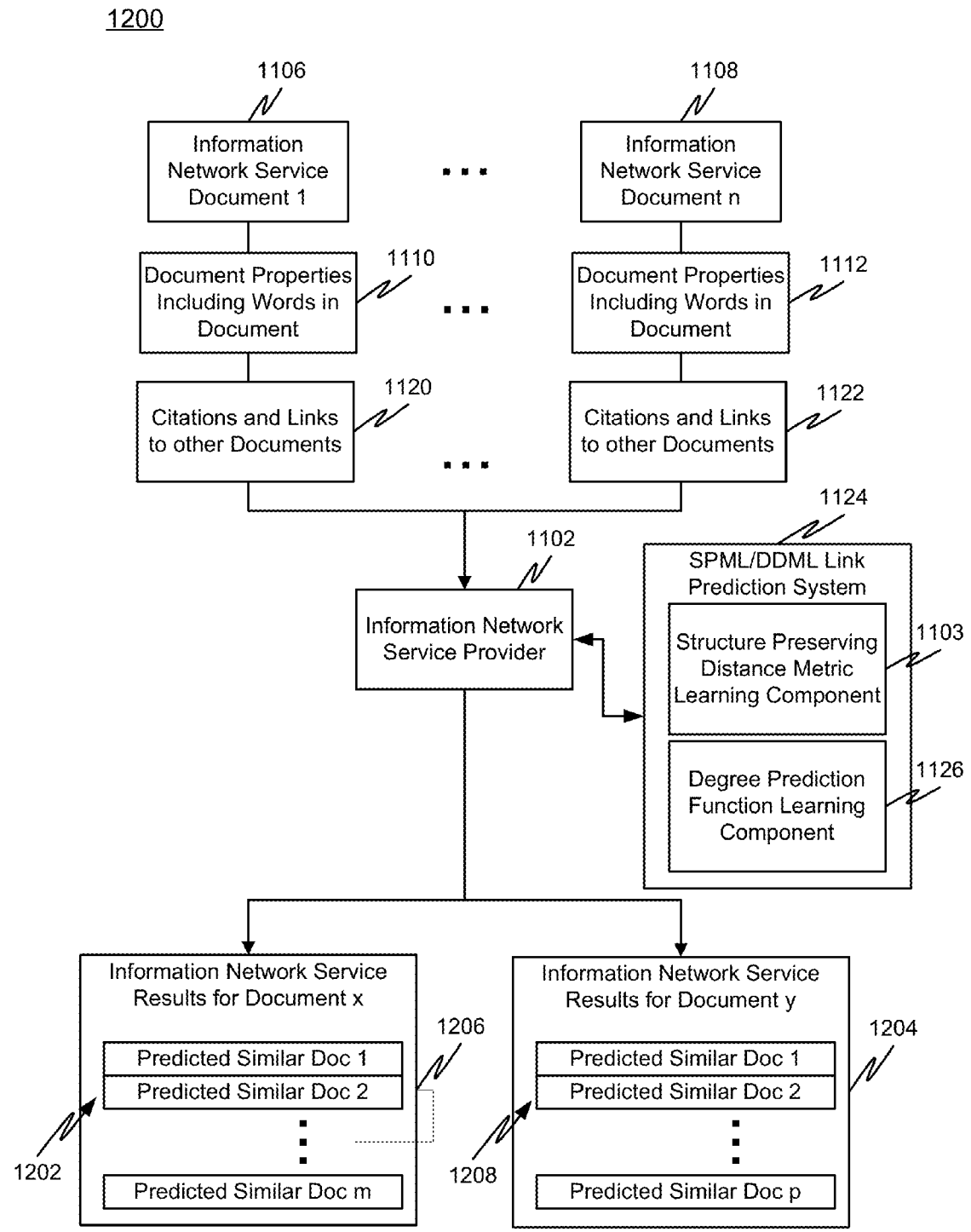
FIG. 12 is a block diagram of a system for predicting links between documents in an information network using SPML/DDML according to some embodiments of the disclosed subject matter.
Figure 13:
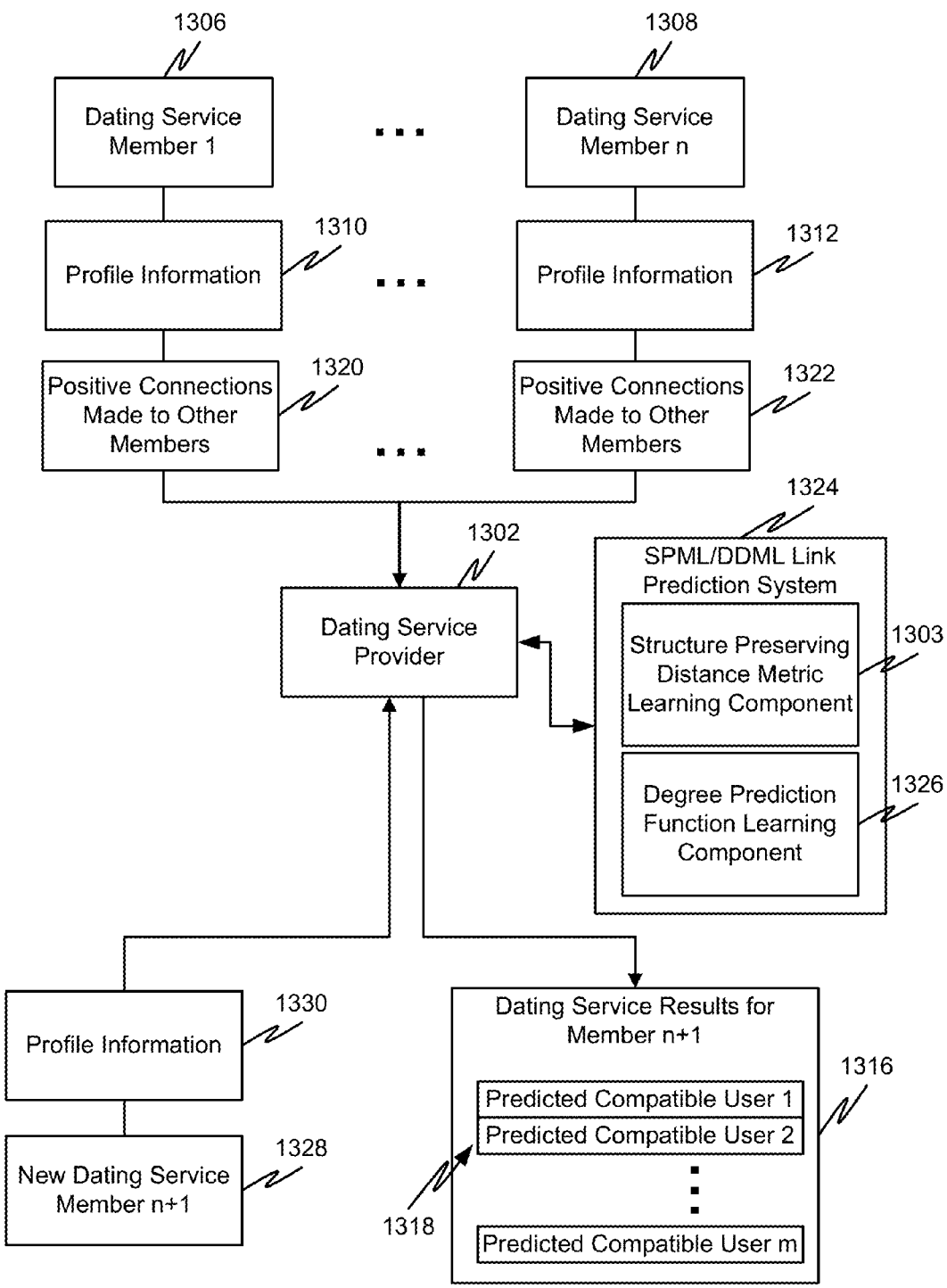
FIG. 13 is a block diagram of a system for predicting connections to new members joining a dating service using SPML/DDML according to some embodiments of the disclosed subject matter.
Figure 14:
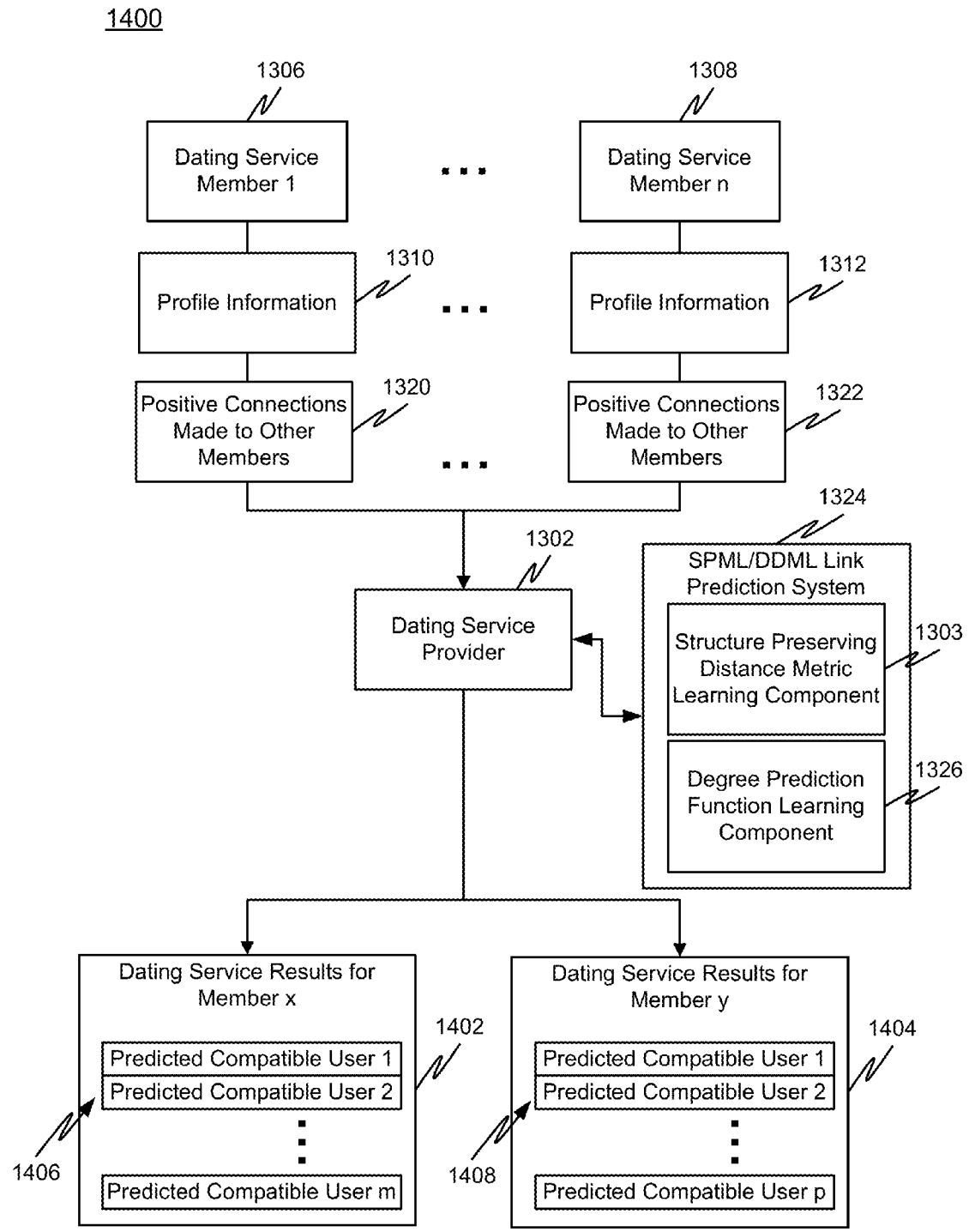
FIG. 14 is a block diagram of a system for predicting connections between members in a dating service using SPML/DDML according to some embodiments of the disclosed subject matter.

At 104, a connection (also often characterized as a "link") prediction request is received from a prediction requestor. The connection prediction request can include information pertaining to a node 114 for which predicted connections are requested. The connection prediction request can, for example, be a request from a user of a social network system that has requested the social network system to recommend a list of new connections for the user, as shown in FIGS. 9 and 10. In another example, a link prediction request can be a request from a user of a document network system that has requested a list of new links between the user's document and other relevant documents, as shown in FIGS. 11 and 12. Additionally, the connection prediction request can, for example, be a request from a user of a dating service system that has requested the dating service system to recommend a list of new connections for the user, as shown in FIGS. 13 and 14. In another example, the connection prediction request can be a request from a user of a shopping service system that has requested the shopping service system to recommend a list of recommended products for the user. In each of these examples, the connection prediction request can be initiated by a user of the systems, and/or the connection prediction request can be initiated by the systems with or without interaction from a user. For example, a component of a social network system can generate, without interaction from the user, a connection prediction request for one or more users of the social network system to provide new connection predictions (or recommendations) to the user unsolicited by the user. In another example, a component of a social network system can generate a connection prediction request in response to a user registering to join, logging into the social network system, and/or changing their profile information in the social network system, and provide the new connection predictions to the user without the user directly requesting new connection predictions. Processing continues to 106.

At 106, SPML or DDML processing is performed to generate an output 124 that can include a list of predicted connections, or links, 126. SPML or DDML processing is performed based the input 112 that can include the node 114 indicated in the received request and a network 118 of which the node 114 is a member or the node 114 can be a new node that is not currently a member. The network 118 can include nodes 120 (each node having properties or features that characterize each node respectively) and connections (links) between them 122.

As indicated at 116, the node data includes property data (or features) 116 that provides characteristics of the node, for example, characteristics of a social network user. In a social networking system the node 114 represents the user and the node features 116 can include many characteristics of the including but not limited to the user's age, sex, status, college, college major, college dorm, college graduation year, etc. In the document network example, the node 114 can represent the document for which new links have been requested and the node features 116 can include but not limited to word counts, bag-of-words features, and other document characteristics. Processing continues to 108.

At 108 the predicted connections, or links, 126 are transmitted to the prediction requestor. The predicted connections can be transmitted to the prediction requestor in a ranked list such that the first predicted connection is, using the learned structure preserving distance metric, closer to the input node than the second predicted connection and so on. Optionally, class information can be transmitted to the prediction requestor identifying the class or some other correlation that exists between the input node and each predicted connection which resulted in the connection being predicted. Processing continues to 110, where processing ends.

Figure 2:
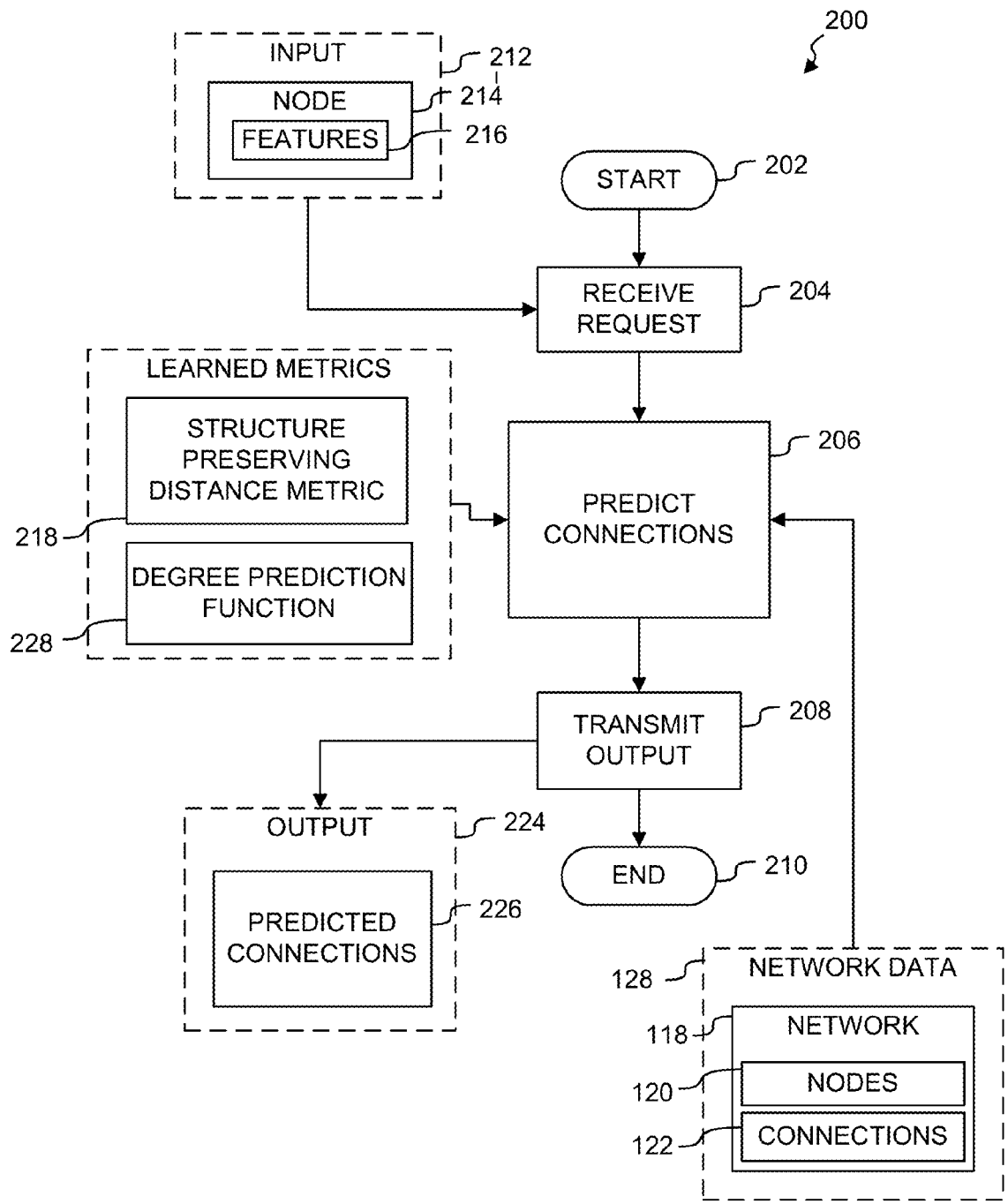
FIG. 2 is a flowchart showing an exemplary embodiment of a structure preserving metric learning (SPML/DDML) connection prediction method according to some embodiments of the disclosed subject matter.

FIG. 2 is a flowchart showing an exemplary embodiment of a structure preserving metric learning (SPML) connection prediction method 200 according to some embodiments of the disclosed subject matter. Processing begins at 202 and continues to 204.

At 204, a connection prediction request is received from a prediction requestor such as a social network user in conjunction with a social network service provider. The connection prediction request can indicate a node 214 for which predicted connections are requested. A connection prediction request can, for example, be a request from a user of a social network system that has requested the social network system to recommend a list of new connections for the user. In another example, a link prediction request can be a request from a user of a document network system that has requested a list of new links to other relevant documents. Processing continues to 206.

At 206, processing is performed based on an input 212 to generate an output 224 that can include a list of predicted connections, or links, 226. The input 212 can include a structure preserving distance metric 218 and the node 214 for which predicted connections were requested. The node 214 can belong to a network of nodes and connections, and SPML can be used to learn the structure preserving distance metric 218 between the nodes of the network. The node 214 can include node features 216. The structure preserving distance metric 218, the node 214, and the node features 216 can be used to generate the list of predicted connections, or links, 226. Processing continues to 208.

At 208 the predicted connections, or links, 226 are transmitted to the prediction requestor. The predicted connections can be transmitted to the prediction requestor in a ranked list such that the first predicted connection is, using the learned structure preserving distance metric, closer to the input node than the second predicted connection and so on. Optionally, class information can be transmitted to the prediction requestor identifying the class or some other correlation that exists between the input node and each predicted connection which resulted in the connection being predicted. Processing continues to 210, where processing ends.

Figure 3:
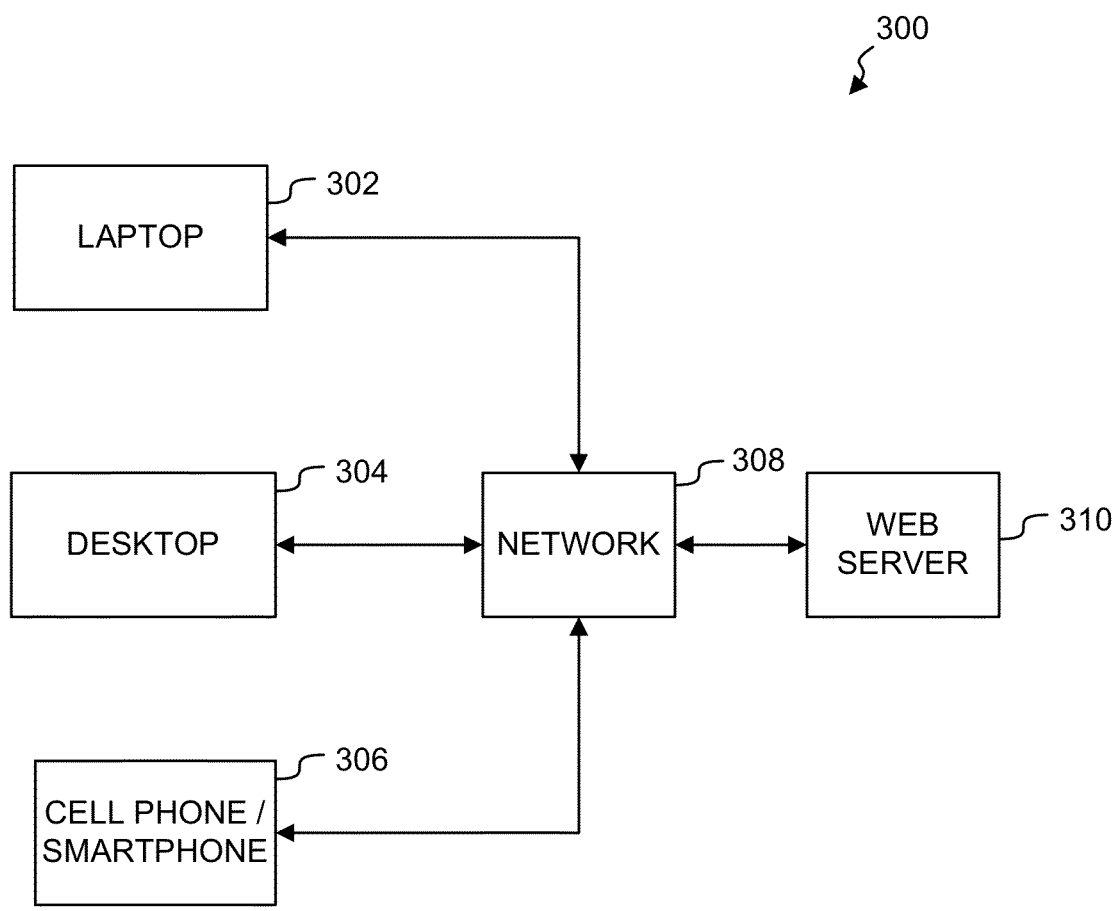
FIG. 3 is a diagram of an exemplary embodiment of a structure preserving metric learning (SPML/DDML) prediction system according to some embodiments of the disclosed subject matter.

FIG. 3 is a diagram of an exemplary embodiment of a structure preserving metric learning (SPML) prediction system according to some embodiments of the disclosed subject matter. System 300 can include a laptop user computer 302, a desktop user computer 304, a smartphone user computer 306 and a web server 310. The laptop user computer 302, desktop user computer 304, and smartphone user computer 406 can transmit data to and/or receive data from the web server 310 via a network 308.

In operation, a user operating the laptop user computer 302, desktop user computer 404, and/or smartphone user computer 306 can, via a web browser, send a request to the web server 310.

The user request can, for example, include a request to join a social networking site and receive a list of recommended connections, or a request for an existing user of the social networking site to receive a list of recommended new connections. In this example, the web server 310 can, given the user's profile information and/or features, generate a list of predicted new connections for the user according to the SPML or DDML methods provided herein. The SPML/DDML enabled web server 310 can, in this example, transmit the list of predicted new connections to the requesting user via the network 308.

In another example the request can include a request to submit a new document to an online document network and receive a list of recommended links for the new article, or a request to receive recommended new links for an existing document in the document network. In this example, the web server 310 can, given the document's word count, bag-of-words, and/or document features, generate a list of predicted new links relevant to the document according to the SPML or DDML methods provided herein. The web server 310 can, in this example, transmit the list of predicted new links to the requesting user via the network 308.

Figure 4:
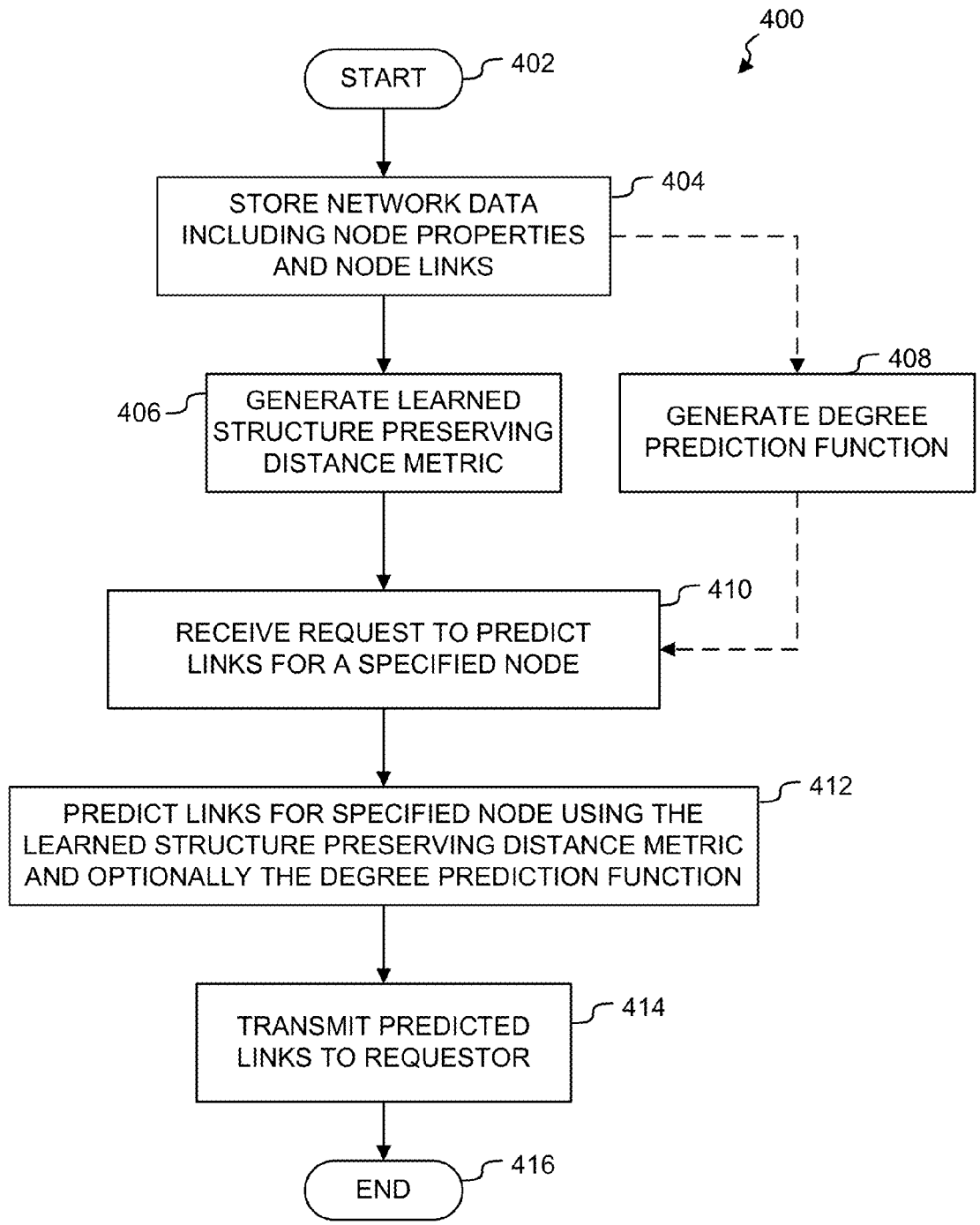
FIG. 4 is a flowchart showing an exemplary method of SPML/DDML link prediction according to some embodiments of the disclosed subject matter.

FIG. 4 is a flowchart showing an exemplary method of SPML/DDML link prediction 400 according to some embodiments of the disclosed subject matter. Processing begins at 402 and continues to 404.

At 404, network data including node properties and node links is stored on a data store accessible by a link prediction processor. For example, the network data can be stored in a database server and the link prediction processor can be a computer network server that can, for example, access the database server via a network. The network data can, for example, represent social networks such as Facebook, MySpace, and similar networks, dating service networks such as eHarmony, Match.com, and similar networks, document networks such as Wikipedia, and similar networks, and shopping networks such as Amazon.com and similar networks, as described in FIGS. 9-16. Processing continues to 406 or optionally continues concurrently or sequentially to 406 and 408.

At 406, the link prediction processor learns a structure preserving distance metric by performing a structure preserving metric learning process such as one of the SPML or DDML implementations discussed above, such as, but not limited to, Stochastic DDML or cutting plane DDML.

Optionally, processing can concurrently or sequentially continue to 408 where the link prediction processor can learn a degree prediction function. For example, the link prediction server can perform 406 and 408 concurrently by performing one of the DDML implementations to learn a structure preserving distance metric and a degree prediction function concurrently.

Processing continues to 410. At 410, a request for new link predictions for a specified node with node properties is received from a link prediction requestor. The specified node can be a new node not already represented in the network data or an existing node. Processing continues to 412.

At 412, new links are predicted for the node specified in the request based on the requested node properties, the learned structure preserving distance metric, and optionally the learned degree prediction function. If 408 is not performed and the degree prediction function is not learned, a predetermined number of new links can be predicted for each requested node. The predicted new links can be transmitted to the link prediction requestor in a ranked list such that the first predicted new link node is, under the learned structure preserving distance metric, closer to the specified node than the second predicted new link node and so on. Optionally, class information can be transmitted to the link prediction requestor identifying the class and/or some other correlation that exists between the specified node and each predicted new link which resulted in the connection being predicted. Processing continues to 414.

At 414, the predicted new links are transmitted to the link prediction requestor. Processing continues to 416 where processing ends.

It will be appreciated that the link prediction requestor can, for example, be an end user of a social network service, a document network service, a dating service, or a shopping service, or any other similar service. It will also be appreciated that the link prediction requestor can, for example, be an internal component of any of these services that can request link predictions for any of its users and provide the predicted links to its users with or without a user having to initiate such a request. For example, any of these services can include a registration component that upon a new user registering for the service automatically submits a new link prediction request and presents the new link predictions to the user without the user having to submit a request (see, for example, FIGS. 9, 11, 13, and 15). In another example, any of these services can periodically or upon a change in node properties (e.g. user profile change in a social network or document edits applied in a document network service) submit a new link prediction request and transmit the new link predictions to the user without the user having to submit a request. In these examples, the user can receive link predictions from the services and submit a request for new link predictions via, for example, a website and the new link prediction results can be provided to the user through the website or via an electronic messaging service such as e-mail or instant messaging.

It will also be appreciated that the method can be repeated in whole or in part. For example, 406 and optionally 408 can be repeated to maintain current learned distance metrics and degree prediction functions as changes to the stored network data occur over time (such as node properties and node links changing over time, such as, for example, when a user in a social network service updates their profile or adds/removes friends).

Figure 5:
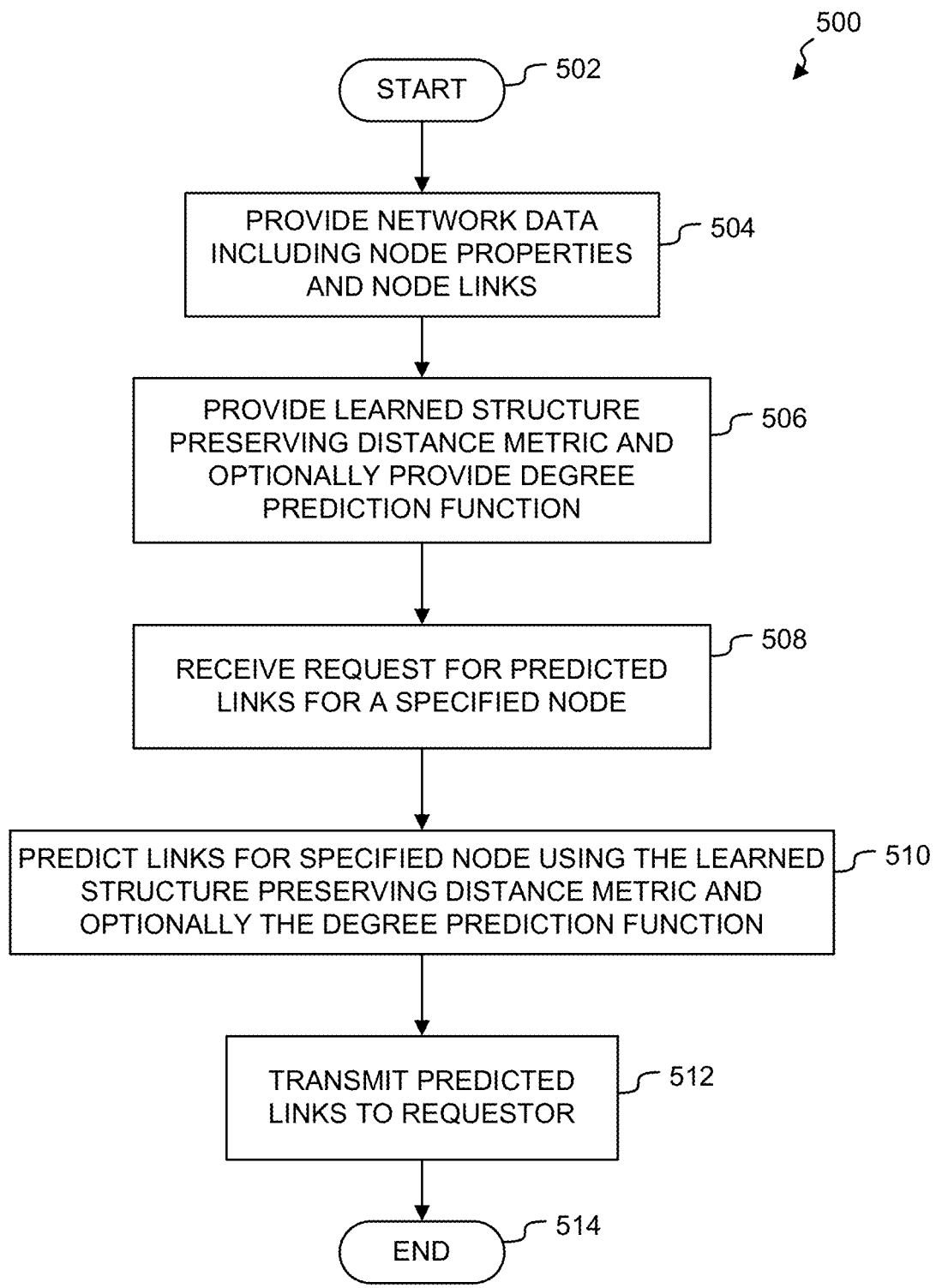
FIG. 5 is a flowchart showing an exemplary method of SPML/DDML link prediction according to some embodiments of the disclosed subject matter.

FIG. 5 is a flowchart showing an exemplary method of SPML/DDML link prediction 500 according to some embodiments of the disclosed subject matter. Processing begins at 502 and continues to 504.

At 504, network data, similar to that described in FIG. 4 above, is provided including node properties and node links. Processing continues to 506.

At 506, a learned structure preserving distance metric and optionally a learned degree preference function are provided. Processing continues to 508.

At 508, a request for new link predictions for a specified node with node properties is received from a link prediction requestor. The specified node can be a new node not already represented in the network data or an existing node. Processing continues to 510.

At 510, new links are predicted for the node specified in the request based on the requested node properties, the learned structure preserving distance metric, and optionally the learned degree prediction function. If the degree prediction function is not provided, a predetermined number of new links can be predicted for each requested node. Processing continues to 512.

At 512, the predicted new links are transmitted to the link prediction requestor. The predicted new links can be transmitted to the link prediction requestor in a ranked list such that the first predicted new link node is, under the learned structure preserving distance metric, closer to the specified node than the second predicted new link node and so on. Optionally, class information can be transmitted to the link prediction requestor identifying the class and/or some other correlation that exists between the specified node and each predicted new link which resulted in the connection being predicted. Processing continues to 514 where processing ends.

Figure 6:
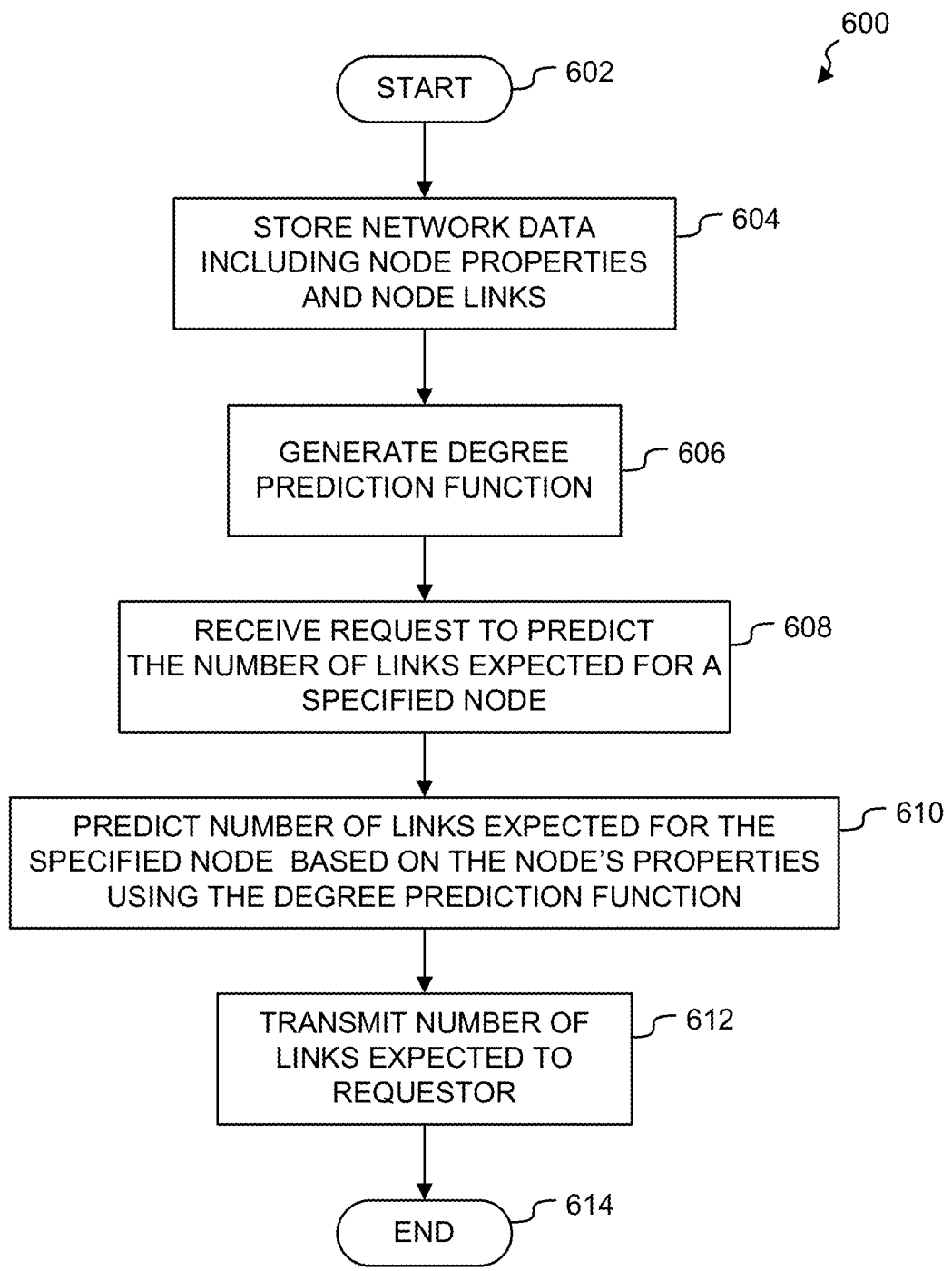
FIG. 6 is a flowchart showing an exemplary method of DDML link degree prediction according to some embodiments of the disclosed subject matter.

FIG. 6 is a flowchart showing an exemplary method of DDML link degree prediction 600 according to some embodiments of the disclosed subject matter. Processing begins at 602 and continues to 604.

At 604, network data including node properties and node links is stored on a data store accessible by a link prediction processor, as described above in FIG. 4. Processing continues to 606.

At 606, a degree prediction function is learned for the network data according to one of the DDML processes described above, such as, for example, Stochastic DDML or cutting plane DDML. Processing continue to 608.

At 608, a request to predict the degree of a specified node given its node properties is received from degree prediction requestor. Processing continues to 610.

At 610, a predicted degree for the specified node is generated based on the specified node's properties using the learned degree preference function according to one of the DDML processes described above. The predicted degree can, for example, be in the form of a probability that the specified node will have a specified degree. Processing continues to 612.

At 612, the predicted degree is transmitted to the degree prediction requestor. Processing continues to 614 where processing ends.

It will be appreciated that the method 600 can be repeated in whole or in part to, for example, maintain a current learned degree preference function as changes occur in the network data (such as changes in the node properties or node links changing, for example, when a user of a social network service updates their profile or adds/removes friends). For example, 606 can be repeated periodically or upon a change in the network data to maintain a current learned degree preference function.

Figure 7:
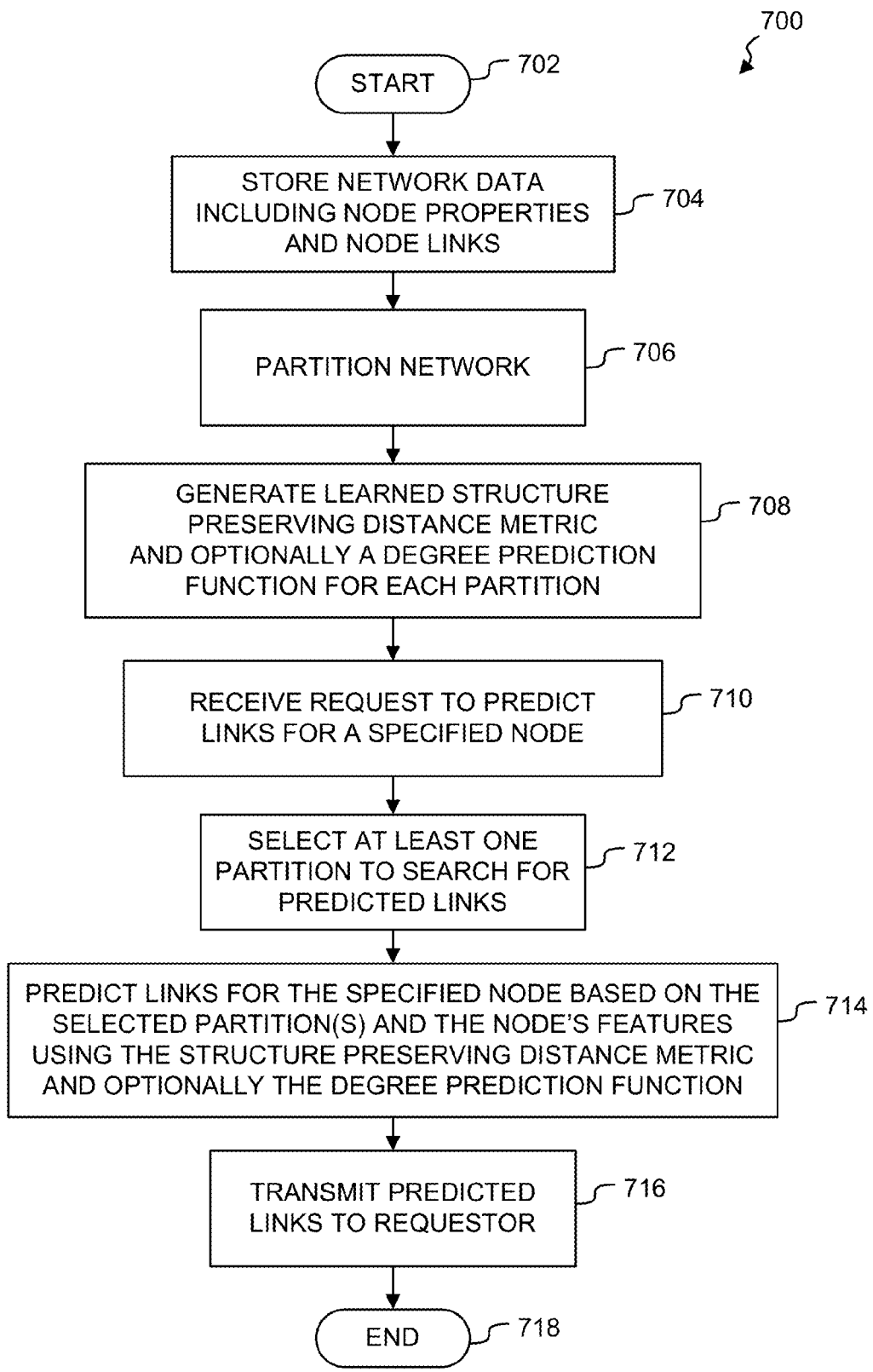
FIG. 7 is a flowchart showing an exemplary method of SPML/DDML link prediction using network partitioning according to some embodiments of the disclosed subject matter.

FIG. 7 is a flowchart showing an exemplary method of SPML/DDML link prediction using network partitioning 700 according to some embodiments of the disclosed subject matter. Processing begins at 702 and continues to 704.

At 704, network data including node properties and node links is stored on a data store accessible by a link prediction processor, as described above in FIGS. 4 and 6. Processing continues to 606.

At 706, the network data is partitioned. Partitioning the network data can, for example, be performed to allow SPML/DDML processes, such as the DDML cutting plane optimization, to be run on smaller segments, or partitions, of the network, so that these processes can be utilized with large networks. In this example, by partitioning large networks into smaller segments, SPML/DDML processes described above, such as the cutting plane optimization can be performed on the smaller network partitions. As indicated elsewhere, natural partitions may arise due to barriers to linking, for example, training data from different schools. Processing continues 708.

At 708, a structure preserving distance metric is learned by performing a structure preserving metric learning process, such as one of the SPML or DDML implementations described above (e.g. the DDML cutting plane optimization), for each of the partitions created in 706. Optionally, a degree preference function can be learned for each partition. For example, when using the DDML cutting plane optimization on each partition a structure preserving distance metric and degree preference function can be learned concurrently for each partition. Processing continues to 710.

At 710, a request for new link predictions for a specified node with node properties is received from a link prediction requestor. The specified node can be a new node not already represented in the network data or an existing node. Processing continues to 412.

At 712, at least one of the partitions created in 706 is selected based on the specified node's properties. Partition selection can also account for the specified node's existing links if the specified node is an existing node in the network data. Processing continues to 714.

At 714, new links are predicted for the node specified in the request based on the partitions selected in 712, the requested node properties, the learned structure preserving distance metric, and optionally the learned degree prediction function. If the degree prediction function is not learned, a predetermined number of new links can, for example, be predicted for each requested node. Processing continues to 716.

At 716, the predicted new links are transmitted to the link prediction requestor. The predicted new links can be transmitted to the link prediction requestor in a ranked list such that the first predicted new link node is, under the learned structure preserving distance metric, closer to the specified node than the second predicted new link node and so on. Optionally, class information can be transmitted to the link prediction requestor identifying the class and/or some other correlation that exists between the specified node and each predicted new link which resulted in the connection being predicted (which can include an indication of the partition used for link prediction). Processing continues to 718 where processing ends.

It will be appreciated that the partitioning of the network data can be performed in various ways depending on the type of network represented by the network data. For example, in a data service network, the network data can, for example, be partitioned geographically under the premise that those users in the same geographic area are more likely to be linked and recommended for dates than those that are geographically remote.

Figure 8:
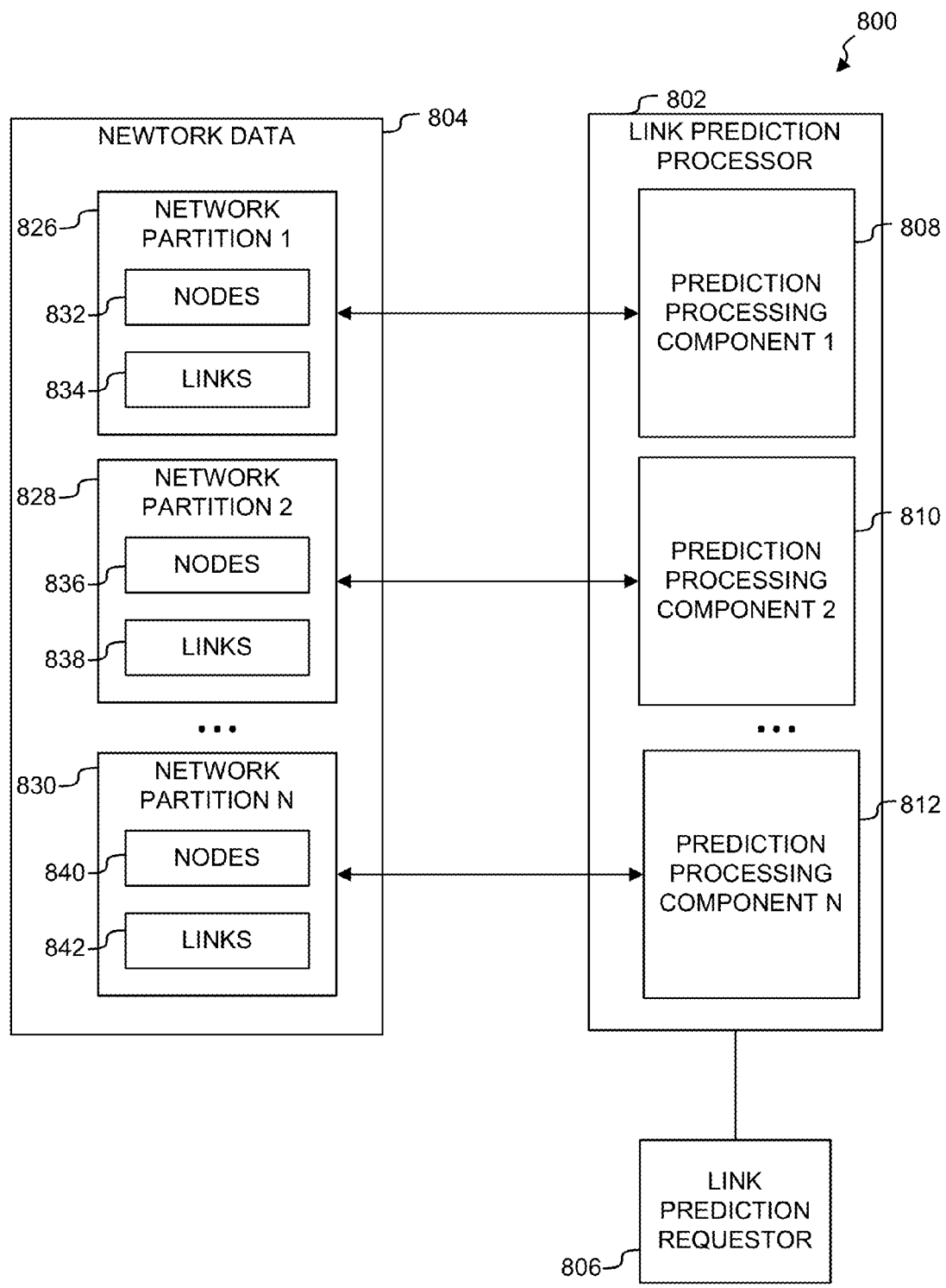
FIG. 8 is a block diagram of an exemplary embodiment of a distributed structure preserving metric learning (SPML/DDML) link prediction system according to some embodiments of the disclosed subject matter.

It will also be appreciated that partitioning the network allows for parallelization of the learning performed at 708, and learning across each partition can be distributed across link prediction processor components, as described in FIG. 8.

It will also be appreciated that the link prediction request described above in FIGS. 4, 6, and 7 can, in some embodiments, specify a plurality of nodes. In such embodiments, links can be predicted among only the specified nodes to create a new network among those nodes, or links can be predicted among the specified nodes and the existing nodes in the network data.

FIG. 8 is a block diagram of an exemplary embodiment of a distributed structure preserving metric learning (SPML/DDML) link prediction system 800 according to some embodiments of the disclosed subject matter. System 800 can include network data 804 that can be partitioned into a plurality of network partitions 826, 828, and 830, and a link prediction processor 802 which can include a plurality of link prediction processing components 808, 810, and 812. Each network partition can include nodes with properties 832, 836, and 840, and node links 834, 838, an 842. System 800 can also include a link prediction requestor 806 that can transmit data to and receive data from the link prediction processor 802. The link prediction processor 802 can transmit data to and receive data from the plurality of link prediction processing components 808, 810, and 812, each of which can be configured to access a partition of the network data 826, 828, and 830.

In operation, the plurality of link prediction processing components 808, 810, and 812 can learn concurrently or in parallel a structure preserving metric from their respective network partitions 826, 828, and/or 830, according to the method described in FIG. 7. The link prediction processor 802 can receive a link prediction request from the link prediction requestor 806, process the request to predict links for the specified node(s)/user(s), and transmit the predicted links to the link prediction requestor 806, according to the method described above in FIG. 7.

FIG. 9 is a block diagram of a system for predicting friendships to new users of a social network using SPML/DDML according to some embodiments of the disclosed subject matter. In particular, the system 900 includes a social network service provider 902 that is coupled to an SPML/DDML link prediction system that can include a structure preserving distance-metric learning component 903 and a degree prediction function learning component 926. The social network service provider 902 is also coupled to an electronic data storage having stored therein data representing a plurality of social network members (906-908) each having a respective set of properties/features or profile information (910-912) and a respective set of friendship information (920-922). The social network provider 902 receives the profile information (910-912) and friendship information (920-922) from one or more respective users (906-908). In response to the received profile information (910-912) and friendship information (920-922), the social network provider 902 performs SPML/DDML link prediction using the SPML/DDML link prediction system 924 including the structure preserving distance-metric learning component 903 and the degree prediction function learning component 926 to predict friendships for users based on their profile information. The SPML/DDML link prediction system 924 can, for example, learn a structure preserving distance metric using the structure preserving distance-metric learning component 903 and learn a degree prediction function using the degree prediction function learning component 926, as described in FIGS. 4-7 where the profile information (910-912) is treated as node properties and the friendship information (920-922) as node links. For example, a new user 928 can register to join the social network and the social network provider 902 receives the new user 928 and the new user's profile information 930. In response to the new user 928, the social network provider 902 can predict friendships to the new user 928 based on the new user's profile information 930 using the SPML/DDML link prediction system 924. The predicted new friendships can be communicated to the user for their approval (e.g., each user may receive an email listing the new predicted friendships or be directed to a web page listing the new predicted friendships). For example, a results set 932 (e.g., in an email or displayed on the user's page at the social network site) can be provided for the new member 928. Within the results are listed the new links 934 selected to match the new member 928. The predicted new links 934 can be provided to the new user in a ranked list such that the first predicted new link node is, under the learned structure preserving distance metric, closer to the new user than the second predicted new link node and so on. Optionally, class information can be transmitted to the new user identifying the class and/or some other correlation that exists between the new user and each predicted new link which resulted in the connection being predicted.

In this example and in the example provided in FIG. 10, the nodes of the network data include the members of the social network service. The node properties include member profile information and the links include friendships between members of the social network service.

It will be appreciated that the social network provider 902 can, in addition to providing new user 928 with the list of predicted new friends 934, also provide the new user 928 as a predicted new friend to those existing users in the list of predicted new friends 934, for example, via an email message or through a message on the social network website.

FIG. 10 is a block diagram of a system for predicting friendships between users of a social network using SPML/DDML according to some embodiments of the disclosed subject matter. In particular, the system 1000 includes the social network service provider 902, SPML/DDML link prediction system 924, structure preserving distance-metric learning component 903, degree prediction function learning component 926, electronic data storage, plurality of social network members (906-908) each having a respective set of properties/features or profile information (910-912) and a respective set of friendship information (920-922), as described above in FIG. 9. System 1000 also includes for two users of the social network site, x and y, predicted friendship results 1002-1004 that each include a plurality of predicted friendships. The social network provider 902 receives updates from users to modify their social network member data such as their profile information and existing friendships, when, for example, a user adds a new friend or changes their profile information. In response to these changes, the social network provider 902 can perform SPML/DDML link prediction using the SPML/DDML link prediction system 924 to predict new friendships for users based on their changed profile information. For example, the social network provider 902 can create predicted new friendships 1006 and 1008 when users x and y update their profile information and/or add/drop friends and provide the results 1002 and 1004 to users x and y (e.g, in an email or displayed on the user's page at the social network site).

In another example the social network provider 902 can perform SPML/DDML link prediction using the SPML/DDML link prediction system 924 to predict new friendships for users periodically or on-demand.

FIG. 11 is a block diagram of a system for predicting links to new documents added to an information network using SPML/DDML according to some embodiments of the disclosed subject matter. In particular, the system 1100 includes an information network service provider 1102 that is coupled to an SPML/DDML link prediction system 1124 that can include a structure preserving distance-metric learning component 1103 and a degree prediction function learning component 1126. The information network service provider 1102 is also coupled to an electronic data storage having stored therein data representing a plurality of information network documents (1106-1108) each having a respective set of document properties (1110-1112) including bag-of-words containing words occurring in the document and a respective set of citation and/or link information (1120-1122). The information network provider 1102 receives the document properties (1110-1112) and citation and/or link information (1120-1122) from one or more respective documents (1106-1108). In response to the received document properties (1110-1112) and citation and/or link information (1120-1122), the information network provider 1102 performs SPML/DDML link prediction using the SPML/DDML link prediction system 1124 including the structure preserving distance-metric learning component 1103 and the degree prediction function learning component 1126 to predict citations/links for documents based on their document properties including bag-of-words information. The SPML/DDML link prediction system 1124 can, for example, learn a structure preserving distance metric using the structure preserving distance-metric learning component 1103 and learn a degree prediction function using the degree prediction function learning component 1126, as described in FIGS. 4-7 where the document properties (1110-1112) is treated as node properties and the citation and/or link information (1120-1122) as node links. For example, a new document 1128 can be submitted to the information network and the information network provider 1102 receives the new document 1128 and the new document's properties 1130. In response to the new document 1128, the information network provider 1102 can predict links/citations to other relevant documents for the new document 1128 based on the new document's properties 1130 including its bag-of-words using the SPML/DDML link prediction system 1124. The predicted new links/citations can be communicated to the author or submitter of the new document 1128 for their approval (e.g., each user may receive an email listing the new predicted links/citations or be directed to a web page listing the new predicted links/citations). For example, a results set 1116 (e.g., in an email or displayed on the author's or submitter's page at the information network site) can be provided for the new document 1128. Within the results are listed the new links/citations 934 predicted to match the new document 1128.

In this example and in the example provided in FIG. 12, the nodes of the network data include the documents in the information network service. The node properties include document properties including bag-of-words and the links include links/citations between documents of the information network service.

It will be appreciated that the information network provider 1102 can, in addition to providing new user 1128 with the list of predicted new friends 1118, also provide the new user 1128 as a predicted new friend to those existing users in the list of predicted new friends 1118, via, for example, an email message or a message on the information network website.

FIG. 12 is a block diagram of a system for predicting links between documents in an information network using SPML/DDML according to some embodiments of the disclosed subject matter. In particular, the system 1200 includes the information network service provider 1102, SPML/DDML link prediction system 1124, structure preserving distance-metric learning component 1103, degree prediction function learning component 1126, electronic data storage, plurality of information network documents (1106-1108) each having a respective set of document properties (1110-1112) and a respective set of links/citations information (1120-1122), as described above in FIG. 11. System 1200 also includes for two documents of the information network site, x and y, predicted links/citations results 1204-1206 that each include a plurality of predicted links/citations 1202, 1208. The information network provider 1102 receives updates from users/authors to modify their document data such as document properties and existing links/citations, when, for example, a document adds a new link/citation or modifies the content of the document. In response to these changes, the information network provider 1102 can perform SPML/DDML link prediction using the SPML/DDML link prediction system 1124 to predict new links/citation for documents based on their modified document properties. For example, the information network provider 1102 can create predicted new links/citations 1202 and 1208 when the content of documents x and y are modified, when their document properties are modified, when links/citations for the documents are added/removed, and/or for some other event, and provide the results 1206 and 1204 to users x and y (e.g, in an email or displayed on the user's page at the information network site).

FIG. 13 is a block diagram of a system for predicting connections to new members joining a dating service using SPML/DDML according to some embodiments of the disclosed subject matter. In particular, the system 1300 includes a dating service provider 1302 that is coupled to an SPML/DDML link prediction system 1324 that can include a structure preserving distance-metric learning component 1303 and a degree prediction function learning component 1326. The social network service provider 1302 is also coupled to an electronic data storage having stored therein data representing a plurality of dating service members (1306-1308) each having a respective set of properties/features or profile information (1310-1312) and a respective set of positive connection information (1320-1322). The dating service provider 902 receives the profile information (1310-1312) and positive connection information (920-922) from one or more respective users (1306-1308). The positive connection information (920-922) can include communications initiated by a user with another user, or any other positive interaction between users such as dates, communications, or the like. In response to the received profile information (1310-1312) and positive connection information (1320-1322), the dating service provider 1302 performs SPML/DDML link prediction using the SPML/DDML link prediction system 1324 including the structure preserving distance-metric learning component 1303 and the degree prediction function learning component 1326 to predict new connections for users based on their profile information. The SPML/DDML link prediction system 1324 can, for example, learn a structure preserving distance metric using the structure preserving distance-metric learning component 1303 and learn a degree prediction function using the degree prediction function learning component 1326, as described in FIGS. 4-7 where the profile information (1310-1312) is treated as node properties and the positive connection information (1320-1322) as node links. For example, a new user 1328 can register to join the dating service and the dating service provider 1302 receives the new user 1328 and the new user's profile information 1330. In response to the new user 1328, the dating service provider 1302 can predict new connections to the new user 1328 based on the new user's profile information 1330 using the SPML/DDML link prediction system 1324. The predicted new connections can be communicated to the user for their review (e.g., each user may receive an email listing the new predicted connections or be directed to a web page listing the new predicted connections). For example, a results set 1316 (e.g., in an email or displayed on the user's page at the dating service website) can be provided for the new member 1328. Within the results are listed the new links 1334 selected to match the new member 1328.

In this example and in the example provided in FIG. 14, the nodes of the network data include the members of the dating service. The node properties include member profile information and the links include positive connections established between members of the dating service.

It will be appreciated that the dating service provider 1302 can, in addition to providing new user 1328 with the list of predicted new connections 1318, also provide the new user 1328 as a predicted new connections to those existing users in the list of predicted new friends 1318, via, for example, an email message or a portion of the dating service website.

FIG. 14 is a block diagram of a system for predicting connections between members in a dating service using SPML/DDML according to some embodiments of the disclosed subject matter. In particular, the system 1400 includes the dating service provider 1302, SPML/DDML link prediction system 1324, structure preserving distance-metric learning component 1303, degree prediction function learning component 1326, electronic data storage, plurality of dating service members (1306-1308) each having a respective set of profile information (1310-1312) and a respective set of connections (1320-1322), as described above in FIG. 13. System 1400 also includes for two members of the dating service site, x and y, predicted new connections results (1402-1404) that each include a plurality of predicted new connections (1406-1408). Various events can trigger the dating service provider 1302 to predict new connections, such as when the dating service provider 1302 receives updates from members to modify their profile information and/or when members update their connection information, and/or other dating service events. In response to these changes, the dating service provider 1302 can perform SPML/DDML link prediction using the SPML/DDML link prediction system 1324 to predict new connections for members based on, for example, their modified profile information or connections. For example, the dating service provider 1302 can create predicted new connections 1406 and 1408 when the profile information of members x and y are modified, and/or when connections for the members are added/removed, and provide the results 1406 and 1404 to users x and y (e.g, in an email or displayed on the user's page at the dating service website).

Figure 15:
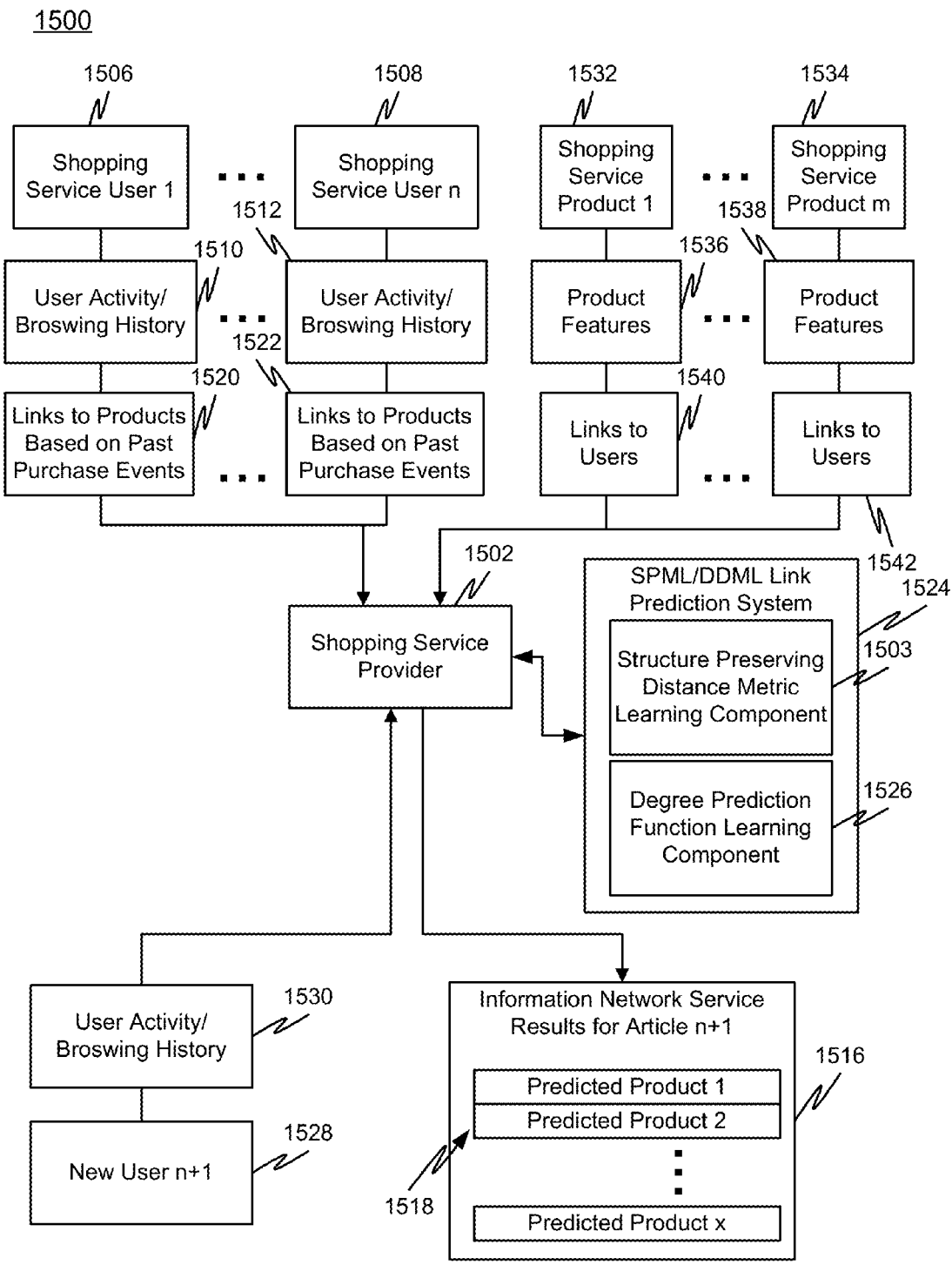
FIG. 15 is a block diagram of a system for recommending products to new users of a shopping service using SPML/DDML according to some embodiments of the disclosed subject matter.

FIG. 15 is a block diagram of a system for recommending products to new users of a shopping service using SPML/DDML according to some embodiments of the disclosed subject matter. In particular, the system 1500 includes a shopping service provider 1502 that is coupled to an SPML/DDML link prediction system 1524 that can include a structure preserving distance-metric learning component 1503 and a degree prediction function learning component 1526. The shopping service provider 1502 is also coupled to an electronic data storage having stored therein data representing a plurality of shopping service users (1506-1508) each having a respective set of properties/features or user profile and activity/browsing history (1510-1512) and a respective set of links to products based on past purchase events (1520-1522). The data storage also having stored therein data representing a plurality of shopping service products (1532-1534) each having a respective set of product features (1536-1538) and a respective set of links to users based on past purchase events (1540-1542). The shopping service provider 1502 receives the user profile and activity/browsing history (1510-1512) and links to products based on past purchase events (1520-1522) from one or more respective users (1506-1508). In response to the user profile and activity/browsing history (1510-1512) and links to products based on past purchase events (1520-1522), the shopping service provider 1502 performs SPML/DDML link prediction using the SPML/DDML link prediction system 1524 including the structure preserving distance-metric learning component 1503 and the degree prediction function learning component 1526 to recommend products for users based on their user profile and/or activity/browsing history. The SPML/DDML link prediction system 1524 can, for example, learn a structure preserving distance metric using the structure preserving distance-metric learning component 1503 and learn a degree prediction function using the degree prediction function learning component 1526, as described in FIGS. 4-7 where the user profile and activity/browsing history (1510-1512) and product features (1536-1538) are treated as node properties and the links to products based on past purchase events (1520-1522) and links to users based on past purchase events (1540-1542) are treated as node links. For example, a new user 1528 can register to join shopping network and the shopping service provider 1502 receives the new user 1528 and the new user's profile information 1530. In response to the new user 1528, the shopping service provider 1502 can recommend products to the new user 1528 based on the new user's profile and/or activity/browsing history 1530 using the SPML/DDML link prediction system 1524. The recommended products can be communicated to the user for possible purchase (e.g., each user may receive an email listing the recommended products or be directed to a web page listing the recommended products). For example, a results set 1516 (e.g., in an email or displayed on the user's page at the shopping service website) can be provided for the new user 1528. Within the results are listed the recommended products 1518 selected to match the new user 1528.

Figure 16:
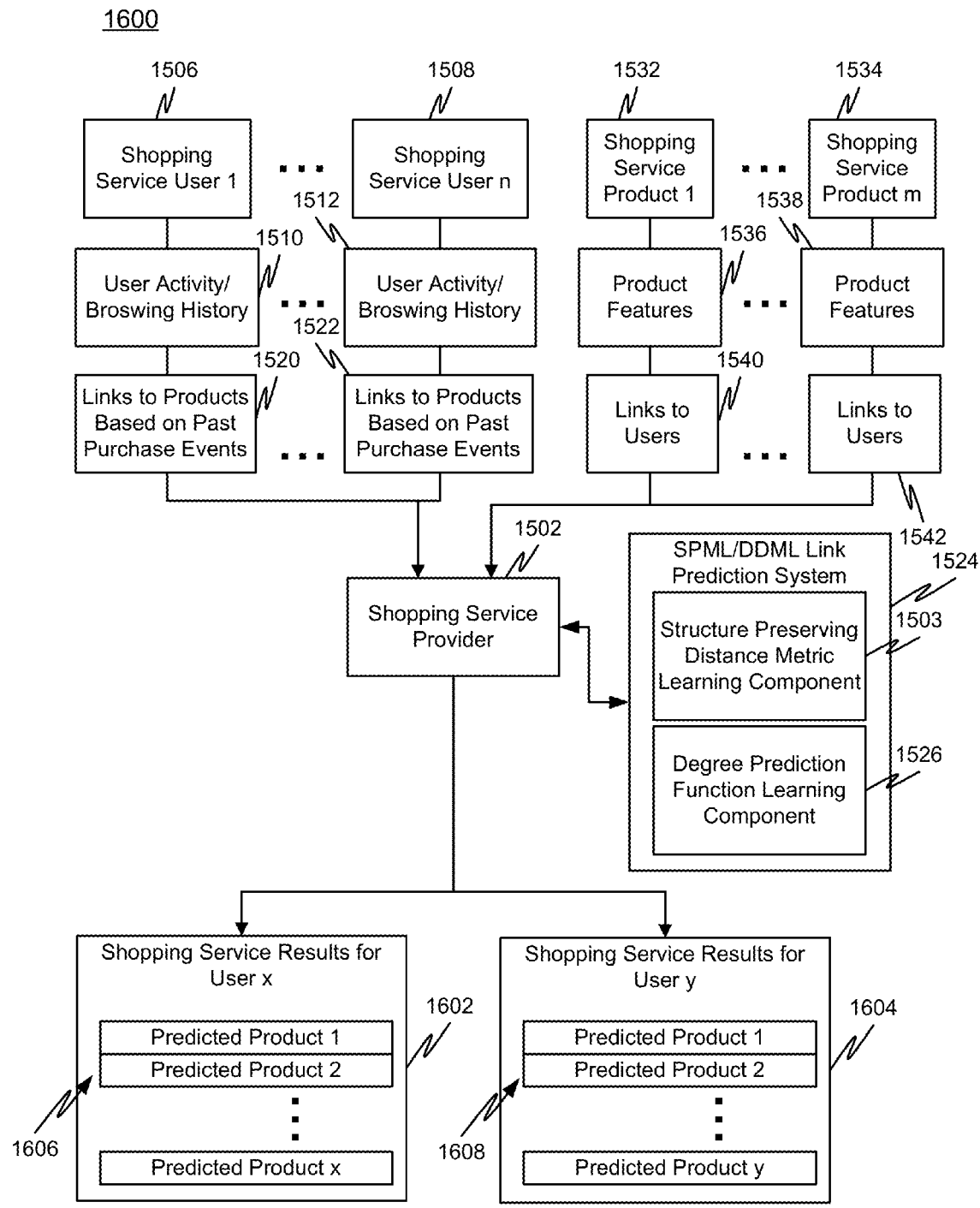
FIG. 16 is a block diagram of a system for recommending products to users of a shopping service using SPML/DDML according to some embodiments of the disclosed subject matter.

In this example and in the example provided in FIG. 16, the nodes of the network data include the users and products of the shopping network service. The node properties include user profile (e.g. gender, age, address, etc.) and activity/browsing history and product features. The node links are between users and products and are determined by purchase events.

FIG. 16 is a block diagram of a system for recommending products to users of a shopping service using SPML/DDML according to some embodiments of the disclosed subject matter. In particular, the system 1600 includes the dating service provider 1502, SPML/DDML link prediction system 1524, structure preserving distance-metric learning component 1503, degree prediction function learning component 1526, electronic data storage, plurality of shopping service members (1506-1508) each having a respective set of profile and activity/browsing history (1510-1512) and a respective set of links to products based on past purchases (1520-1522), and a plurality of shopping service products (1532-1534) each having a respective set of product features (1536-1538) and a respective set of links to users based on past purchases (1540-1542), as described above in FIG. 15. System 1600 also includes for two users of the shopping service site, x and y, recommended new product results (1602-1604) that each include a plurality of recommended products (1606-1608). Various events can trigger the shopping service provider 1502 to predict new links between users and products, such as when a user's user activity/browser history has changed, and/or when purchases are made, and/or other shopping service events. In response to these changes, the shopping service provider 1502 can perform SPML/DDML link prediction using the SPML/DDML link prediction system 1524 to predict new product recommendations for members based on, for example, their modified profile information or purchases. For example, the shopping service provider 1502 can recommend new products 1606 and 1608 when the profile information of members x and y are modified, when their user activity/browser history is modified, and/or when purchases are made, and provide the results 1602 and 1604 to users x and y (e.g, in an email or displayed on the user's page at the shopping service website).

It will be appreciated that each of the social network, dating service, information network, and shopping service discussed above can be Internet based and provide a website for interaction between the service and its users/members. Users can connect to the servers over any type of network device including but not limited to a desktop computer, a laptop computer, a tablet, a web enabled cell phone, etc.

Figure 17:
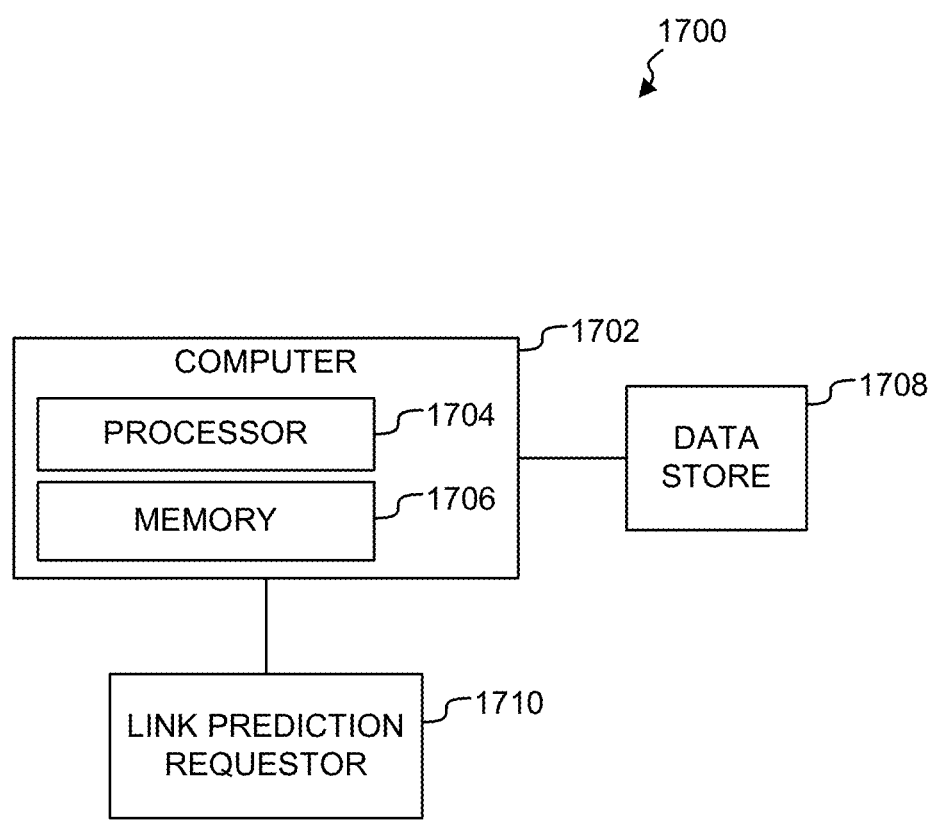
FIG. 17 is a block diagram of an exemplary embodiment of a structure preserving distance-metric learning link prediction system according to some embodiments of the disclosed subject matter.

FIG. 17 is a block diagram of an exemplary embodiment of a structure preserving distance-metric learning link prediction system 1700 according to some embodiments of the disclosed subject matter. System 1700 can include a computer 1702 that can include a processor 1704 and a memory 1706. The computer 1702 can transmit data to and receive data from a data store 1708. The computer 1702 can transmit data to and receive data from a link prediction requestor 1708.

In operation, the processor 1704 will execute instructions stored on the memory 1706 that cause the computer 1702 to access network data from the data store 1708 to perform SPML/DDML link prediction in response to receiving a link prediction request from the link prediction requestor 1710 according to the processes shown in FIGS. 1B and 2-7.

Note that network data may include points that are inevitably disconnected from other points. For example, network may be available representing friend networks for different schools. In such data, the lack of links between points in different schools lacks information for training the distance metric. However, both sets may be used to train a single metric. Thus, it will be apparent how the above algorithms may be modified to account for this disconnectedness in the training data. Further, networks may contain inherent resistances or amplifiers that affect the likelihood of a link being realized. In addition, some links may indicate a stronger affinity than others. For example, links formed across inconvenient geographic distances or which endure for longer periods of time may be weighted more strongly in the optimization of the distance metric.

In any of the above-described, or the below-claimed embodiments, in addition to generating recommended or proposed links (relationships, connections, friendships, transactions, depending on the type of network) the method or system may also store the proposed link and use that new link in further processing for new nodes or proposed nodes. For example, when a social network system recommends a friendship and a transaction is detected confirming the relationship, such as the detection of a transaction such as an email exchange, the method or system may incorporate the new link into the network and do additional processing based on the presence of the link. The incorporation of the link in the network may include the storage of new profile data if the link is associated with a new node.

It will be appreciated that the data store 1708 may be attached to the system using any network connection type, or alternatively the network data store 1710 can directly attached to the system.

In any of the disclosed embodiments, including the claims, where a single computer or processor is recited, in alternative embodiments more than one computer or processor may be used, for example to process data in parallel. In the foregoing embodiments and in the claims, the term learning identifies training process, for example, one involving optimization of a distance metric based on link data. In any of the embodiments, the link terms such as link, relationship, transaction, are used in the various embodiments to identify of connections between object, persons, entities, or other things, and which may be represented as a network in a computer data store.

It will be appreciated that according to the above-described, or the below-claimed embodiments a trained (or learned) metric allows for the generation of a ranked list of predicted connections between one or more new or target nodes to other nodes, the ranking being by distance as measured by the learned metric. In some embodiments where the degree preference function is not provided, a predetermined value may be used to determine the number of predicted connections to provide from the ranked list. Alternatively, in some other embodiments where the degree preference function is not provided, the number of predicted connections provided may be specified by the user (e.g. the user can specify how many predicted connection to provide) or determined according to a rule responsive to the new or target node properties (e.g. profile data) or inferred from other data indicating user activity on other networks (e.g. when a user joins one social network such as Facebook, the number of links to be predicted could be determined based on the user's properties and/or links existing in other social network such as Google+, which the social network being joined could access using public data without needing the new user's authorization or using the authorization of the user the social network being joined could access the user's private profile and/or link data in the other social network).

It will also be appreciated that the modules, processes, components, systems, and sections described above can be implemented in hardware, hardware programmed by software, software instruction stored on a non-transitory computer readable medium or a combination of the above. For example, a method for indicating a maintenance operation can be implemented, for example, using a processor configured to execute a sequence of programmed instructions stored on a non-transitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, LabVIEW, or another structured or object-oriented programming language. The sequence of programmed instructions and data associated therewith can be stored in a non-transitory computer-readable medium such as a computer memory or storage device which may be any suitable memory apparatus, such as, but not limited to read-only memory (ROM), programmable read-only memory (PROM), electrically erasable programmable read-only memory (EEPROM), random-access memory (RAM), flash memory, disk drive and the like.

Furthermore, the modules, processes, systems, and sections can be implemented as a single processor or as a distributed processor. Further, it should be appreciated that the steps mentioned above may be performed on a single or distributed processor (single and/or multi-core). Also, the processes, modules, and sub-modules described in the various figures of and for embodiments above may be distributed across multiple computers or systems or may be co-located in a single processor or system. Exemplary structural embodiment alternatives suitable for implementing the modules, sections, systems, means, or processes described herein are provided below.

The modules, processors or systems described above can be implemented as a programmed general purpose computer, an electronic device programmed with microcode, a hardwired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a programmable logic device (PLD), programmable logic array (PLA), field-programmable gate array (FPGA), programmable array logic (PAL) device, or the like. In general, any process capable of implementing the functions or steps described herein can be used to implement embodiments of the method, system, or a computer program product (software program stored on a non-transitory computer readable medium).

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a very-large-scale integration (VLSI) design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of ventilation control and/or computer programming arts.

Moreover, embodiments of the disclosed method, system, and computer program product can be implemented in software executed on a programmed general purpose computer, a special purpose computer, a microprocessor, or the like.

It is, thus, apparent that there is provided, in accordance with the present disclosure, systems, methods, and devices for enhancing the value of network based systems. Many alternatives, modifications, and variations are enabled by the present disclosure. Features of the disclosed embodiments can be combined, rearranged, omitted, etc., within the scope of the invention to produce additional embodiments. Furthermore, certain features may sometimes be used to advantage without a corresponding use of other features. Accordingly, Applicants intend to embrace all such alternatives, modifications, equivalents, and variations that are within the spirit and scope of the present invention.

Embodiments of the disclosed subject matter can include a method for generating proposed recommendations (or predictions) for new relationships (or links) in a social network and directing an output from at least one computer network server to a terminal connected thereto by a computer network. Node properties (or profiles) and links can be stored on a data store accessible by the at least one computer network server. Each profile can be a data set containing characteristics of a respective one of a plurality of persons and each link can be a data set that corresponds to a relationship of a predefined type between one of the plurality of persons to linked one of the plurality of persons such that some of the plurality of persons are linked to first persons and unlinked to second persons, whereby each link corresponds to a linked pair of persons. The totality of links can define a network. The method can include, using at least one computer network server, programmatically training a classifier based on distance metrics, each distance metric characterizing a respective one of the linked pairs. The distance metric can be responsive to outside links which are links other than the respective one of the linked pairs, such that the totality of links can be derived from the classifier based on the profiles without the links. Data corresponding to a new person not linked to any other persons links in the network can be received and a new profile representing the new person can be generated. This data can be received when a new user registers to join the social network and the social network can recommend/predict to the new user connection to existing users. The method can include, using the classifier, generating predicted links responsively to the new profile and outputting data responsive to the predicted links.

In some such embodiments the method can also include receiving relationship data from the plurality of persons and generating a new link responsive thereto, wherein the relationship data include data indicating at least one communication event between persons joined by the new link. For example, when users of a dating service network communicate with each other.

In some such embodiments the method can also include receiving relationship data from the plurality of persons and generating a new link responsive thereto, wherein the relationship data include data indicating a command received from a respective one of the plurality of persons to be connected to another of the plurality of persons. For example, when users of a social network "friend" each other to form a connection or link.

In some such embodiments the method can also include receiving relationship data from the plurality of persons and generating a new link responsive thereto, wherein the relationship data include data indicating a common class to which persons joined by the new link belong. The common class can include any or all of a family, a school class, membership in a club, a common employer, common vocation or hobby, a geographic distance between residences of the persons joined by the new link. The common class can be responsive to transaction data received by the at least one computer network server, and the transactions can represent transactions between persons joined by the new link. The transactions can include communication transactions and commercial transactions between persons joined by the new link.

Embodiments of the disclosed subject matter can include computer readable mediums each containing program instructions for causing the at least one computer network server and/or a processor to implement one or more of any of the various methods described herein.

Embodiments of the disclosed subject matter can include a method for recommending a new relationship for network members. The method can include storing profile data characterizing each of the network members according to predefined features of the each of the members. The method can also include storing relationship data that defines the presence of predefined relationships among the network members based on data indicating transactions between the network members and/or data provided a priori to indicate the existence of a relationship, the relationship thereby defining links between the network members. A request can be received, at a network server, from a client of the network server, for a prediction for a target member of a new relationship that is not present in the relationship data. The method can include, at the network server, predicting, for the target member, the new relationship, responsively to profile data characterizing the target member and responsively to relationship (or link) data defining relationships (or links) among network members.

Embodiments of the disclosed subject matter can include a method for generating product recommendations. The method can include receiving, at a computer network server, profile data, and transaction data indicating transactions of shoppers using a shopping web site. The profile data can characterize features of the shoppers (such as but not limited to age, gender, address, etc.). The profile data can also including features of products offered by shopping web site. The method can include storing link data representing links, each link defining an association between a respective one of the shoppers and a product with respect to which the shopper performed a transaction (such as a purchase and/or adding the product to the user's shopping cart or a wish list indicating an interest in the product). A classifier can be trained (or learned) based on the link data and new product recommendation data can be generated for current shoppers using the shopping site based on the classifier and profile data characterizing the features of the current shoppers.

Embodiments of the disclosed subject matter can include a method for generating proposed link recommendations for output to requesting processes running on one or more processor devices connected to at least one computer network server through a connecting computer network. The method can include storing, on a data store that is accessible by the at least one computer network server, profiles and links, each profile of the profiles being a data set containing characteristics of a respective one of a plurality of entities, each link of the links being a data set that corresponds to a relationship of a predefined type between one of the plurality of entities to linked one of the plurality of entities such that some of the plurality of entities are linked to respective first entities and not linked to second entities, whereby each link corresponds to a linked pair of entities, the totality of links defining an relationship network. A classifier can be programmatically trained (or learned) based on distance metrics, each distance metric characterizing a respective one of the linked pairs, wherein the distance metric is responsive to links other than ones corresponding to the linked pair; the classifier being such that at least a substantial extent of a totality of the links can be derived from the classifier responsively to the profiles without the information content of the links, whereby the trained (or learned) classifier contains all the structural information of the extent of the relationship network. The method can also include receiving a profile corresponding to a new entity and generating at least one link representing the new entity.

In some such embodiments the generating can include, using the classifier to estimate a structure of a new network that includes the new entity including predicting a number of the at least one link. For example, by using SPLM or DDML to learn a structure preserving classifier and, optionally, a degree preference function.

Embodiments of the disclosed subject matter can include a computerized method for predicting links between nodes in a network using a computing device. The method can include storing data representing node properties in a data storage device accessible by a processor. Links between the nodes can be stored in the data storage device. Each node property can represent a characteristic of a person, a document, an event, web site, or other thing. Each link can represent a relationship between nodes, whereby the links define a relationship network. A classifier can be generated (or learned) from the relationship links and the node properties using a structure preserving method adapted to, when so-generated (or learned), reproduce substantially all of the links from the node properties, whereby the classifier substantially preserves a structure defined by the links. A link prediction request can be received from a prediction requestor, the link prediction request specifying an input node having input node properties. A plurality of new links can be predicted for the input node responsively to the input node properties and the learned distance metric. The method can also include transmitting the predicted plurality of new links to the prediction requestor.

Embodiments of the disclosed subject matter can include a computerized method for predicting the degree of a node in a network using a computing device. The method can include storing network data representing node properties and links between the nodes in a data storage device accessible by a processor, each node property representing a characteristic of a person, a document, an event, web site, or other thing, and each link representing a relationship between nodes, the aggregate properties and links defining a network. A degree prediction function can be generated (or learned) from the network data including the node properties and the links between the nodes using a structure preserving process. The degree prediction function can be substantially structure preserving, and the degree prediction function can substantially predict the degrees of the nodes based on the node properties. A degree prediction request can be received from a prediction requestor, the degree prediction request specifying an input node having input node properties. A degree prediction can be predicted for the input node responsively to the input node properties and the degree prediction function. The method can include transmitting the degree prediction to the prediction requestor.

Embodiments of the disclosed subject matter can include a computerized method for learning a structure preserving distance metric for an existing network to predict connectivity of a new network using a computing device. The method can include providing existing network data accessible by a processor, the existing network data representing node properties and links between the nodes. Each node property can represent a characteristic of a person, a document, an event, web site, or other thing, and each link can represent a relationship between the thing represented by the node, the aggregate properties and links defining an existing network. A learned distance metric can be generated (or learned) from the existing network data including the node properties and the links between the nodes using a structure preserving process. The learned distance metric can be substantially structure preserving; the learned distance metric can substantially recreate the links between the nodes when used by a connectivity algorithm to recreate links in the existing network based on the node properties. A network prediction request can be received from a prediction requestor, the network prediction request specifying a set of input nodes, each having input node properties. A plurality of new links can be predicted between the set of input nodes responsively to the input node properties and the learned distance metric. The method can include transmitting the predicted plurality of new links to the prediction requestor.

Embodiments of the disclosed subject matter can include a computerized method for predicting links between users in an online social network using a computing device. The method can include storing network data representing user properties and links between the users in a data storage device accessible by a processor. Each user property can represent a characteristic of the user, and each link can represent a relationship between users, the aggregate properties and links defining a network. A learned distance metric and a degree predicting function can be generated (or learned) from the network data including the user properties and the links between the users using a structure preserving process. The learned distance metric can be substantially structure preserving; the learned distance metric and degree predicting function can substantially recreate the links between the users when used by a connectivity algorithm to recreate links in the network based on the user properties. A link prediction request can be received from a prediction requestor, the link prediction request specifying an input user having input user properties. A plurality of new links can be predicted for the input user responsively to the input user properties and the learned distance metric. The method can include transmitting the predicted plurality of new links to the prediction requestor.

Embodiments of the disclosed subject matter can include a computerized method for learning a structure preserving distance metric and a degree predicting function from a network. The method can include providing network data accessible by a processor, the network data representing node properties and observed links between the nodes. Each node property can represent a characteristic of a person, a document, an event, web site, or other thing, and each observed link can represent a relationship between the thing represented by the node, the aggregate properties and observed links defining a network. The method can include generating (or learning) a learned distance metric and degree predicting function from the network data including the node properties and the observed links using a structure preserving process. The learned distance metric can be substantially structure preserving; the learned distance metric can substantially recreate the observed links when used by a connectivity algorithm with the degree predicting function to predict links in the network based on the node properties.

Embodiments of the disclosed subject matter can include a computerized method for predicting links between nodes in a network using a computing device. The method can include storing network data representing node properties and links between the nodes in a data storage device accessible by a processor, each node property representing a characteristic of a person, a document, an event, web site, or other thing, and each link representing a relationship between the thing represented by the node, the aggregate properties and links defining a network. A learned distance metric can be generated (or learned) from the network data including the node properties and the links between the nodes using a structure preserving process. The learned distance metric can be substantially structure preserving; the learned distance metric can substantially recreate the links between the nodes when used with a connectivity algorithm to recreate links in the network based on the node properties. The method can include receiving a link prediction request from a prediction requestor, the link prediction request specifying an input node having input node properties and a plurality of input node links. A plurality of new links can be predicted for the input node responsively to the node, the learned distance metric, and the learned degree preference function. The method can include transmitting the predicted plurality of new links to the prediction requestor.

Embodiments of the disclosed subject matter can include a computerized method for predicting links between nodes in a network using a computing device. The method can include storing network data representing node properties and links between the nodes in a data storage device accessible by a processor, each node property representing a characteristic of a person, a document, an event, web site, or other thing, and each link representing a relationship between the thing represented by the node, the aggregate properties and links defining a network. The method can also include providing a distance metric learned from the network data including the node properties and the links between the nodes using a structure preserving process. The learned distance metric can be substantially structure preserving; the learned distance metric can substantially recreate the links between the nodes when used with a connectivity algorithm to recreate links in the network based on the node properties. A link prediction request can be received from a prediction requestor, the link prediction request specifying an input node having input node properties and a plurality of input node links. The method can include predicting a plurality of new links for the input node responsively to the node, the learned distance metric, and the learned degree preference function. The predicted plurality of new links can be transmitted to the prediction requestor.

Embodiments of the disclosed subject matter can include a computerized method for valuing relationships between entities according to their respective descriptions using a computing device. The method can include storing a list of links and feature vectors in a digital data store accessible to a processor. A predictor can be trained (or learned), using the processor, from a list of links and feature vectors, each characterizing a node linked by the links, the predictor being a trainable nonlinear classifier. The predictor can be effective for generating a distance estimate from the feature vectors of a pair of nodes. The training can tune a metric so that it, based on the respective feature vectors, estimates a shorter distance for linked ones of the at least three and a further distance for unlinked ones of the at least three feature vectors for all the feature vectors to produce a trained predictor. The method can include, using the trained predictor, estimating distances between pairs of nodes at least one of whose nodes was not used to train the link predictor. The method can also include outputting selected ones of the estimated distances from the estimating.

Embodiments of the disclosed subject matter can include a computerized method for predicting new links in a network. The network can be, for example, a social network, a dating service network, a shopping network, or any other type of network. The method can include accessing network data from a data store. The network data can include nodes and links, the nodes each having properties characterizing each node and the links each representing a connection between two of the nodes, the nodes and links comprising a network. For example, the nodes can be users of a social network each having profile information as node properties and each user establishing friendships or connections with other users of the social network which can be represented by the links. The method can include learning a classifier for predicting new links in the network, which includes learning a Mahalanobis distance metric M for the network and applying one or more linear constraints on M. The linear constraints applied on M can be configured to enforce the structure of the network to be preserved in M. A link prediction request can be received from a prediction requestor, the request indicating a target node having target properties. For example, the link prediction requestor can be a user registering for a social network for the first time and requesting that the social network provide predicted or recommended links to the user to establish friendships or connection with other users of the social network. In another example, the prediction requestor can be a component of the network (e.g. social network) configured to provide predicted links to its users at periodic intervals or in response to certain user actions (such as a registering to join the social network, changing their user profile, etc.). The method can include predicting one or more new links for the target node responsive to the target node properties by applying a connectivity algorithm to the target node and the network nodes using the learned classifier including the learned distance metric M. The method can also include transmitting the one or more predicted new links to the prediction requestor.

Embodiments of the disclosed subject matter can include a computerized method for making recommendations to users. The method can include receiving at a receiving computer, from a requesting computer, a request indicative of a proposal for a joining entity to join a network, the network representing relationships between networked entities and defined by network data stored in a computer accessible data store. The network data can include feature data characterizing networked entities and link data indicating relationships between respective pairs of the networked entities. The relationships can include transactions, affinities, friendships, common classes to which the entities including businesses or other organizations, people, countries, types, animals or other living things, or anything else that may be characterizable by a network. The user can submit the request through a website and the request can be in the form of an HTTP request. The method can include accessing the network data at the receiving computer or one or more processing computers in communication with the receiving computer and generating a message responsive to a ranking of possible relationships between the joining entity and the networked entities. The ranking can be responsive to feature data characterizing the joining entity. The generating can be by a computational process such that, if the joining entity feature data were identical to the feature data of one of the networked entities, the relationships of the one of the networked entities stored in the network data would be of identical ranking. The responsive message can include or be included within an HTTP response provided to the user in response to the user's HTTP request.

What is claimed is:

1. A method for generating proposed recommendations for new relationships in a social network and directing an output from at least one computer network server to a terminal connected thereto by a computer network, the method comprising:
storing, on a data store accessible by said at least one computer network server, profiles and links, each profile being a data set containing characteristics of a respective one of a plurality of persons, each link being a data set that corresponds to a relationship of a predefined type between one of the plurality of persons to linked one of the plurality of persons such that some of said plurality of persons are linked to first persons and unlinked to second persons, whereby each link corresponds to a linked pair of persons, the totality of links defining a network;
using said at least one computer network server, programmatically training a classifier based on distance metrics, each distance metric characterizing a respective one of said linked pairs, wherein said distance metric is responsive to outside links which are links other than said respective one of said linked pairs, such that said totality of links can be derived from said classifier based on said profiles without said links;
receiving data corresponding to a new person not linked to any other person's links in the network and generating a new profile representing the new person; and
using said classifier, generating predicted links responsively to said new profile and outputting data responsive to said predicted links.

2. The method of claim 1, further comprising receiving relationship data from said plurality of persons and generating a new link responsive thereto, wherein said relationship data include data indicating at least one communication event between persons joined by said new link.

3. The method of claim 1, further comprising receiving relationship data from said plurality of persons and generating a new link responsive thereto, wherein said relationship data include data indicating a command received from a respective one of said plurality of persons to be connected to another of said plurality of persons.

4. The method of claim 1, wherein said distance metric is a Mahalanobis distance metric.

5. The method of claim 4, wherein the training includes minimizing an objective function using a stochastic gradient descent algorithm.

6. The method of claim 1, wherein the distance metric's dependence on said outside links is generated responsively to the existence of said outside links and without referring to classes to which persons linked by the outside links belong, whereby structural information of said outside links is used in said predicting.

7. A computerized method for predicting links between nodes in a network using a computing device, the method comprising:
storing data representing node properties in a data storage device accessible by a processor;
storing links between the nodes in the data storage device;
each node property representing a characteristic of a person, a document, an event, web site, or other thing;
each link representing a relationship between nodes, whereby the links define a relationship network;
generating a classifier from said relationship links and said node properties using a structure preserving method adapted to, when so-generated, reproduce substantially all of said links from said node properties, whereby said classifier substantially preserves a structure defined by said links;
receiving a link prediction request from a prediction requestor, said link prediction request specifying an input node having input node properties;
predicting a plurality of new links for said input node responsively to said input node properties and said learned distance metric; and
transmitting said predicted plurality of new links to said prediction requestor.

8. The method of claim 7, wherein said generating includes modeling degree distributions embodied by said links.

9. The method of claim 7, wherein said generating is optimized using a cutting plane algorithm.

10. The method of claim 7, wherein said generating said classifier includes optimizing an objective function using a stochastic gradient descent method.

11. The method of claim 7, wherein said generating a classifier includes:
iteratively comparing triplets of said nodes, each triplet comprising a first node, a second node, and a third node, wherein said second node is linked to said first node and said third node is not linked to said first node; and
learning a distance metric generator in which for each said triplet said third node is further from said first node than said second node.

12. The method of claim 7, wherein said generating includes:
iteratively comparing triplets of said nodes, each triplet comprising a first node, a second node, and a third node, wherein said second node is linked to said first node and said third node is not linked to said first node; and
learning a distance metric in which for each said triplet said third node is further from said first node than said second node.

13. A computerized method for predicting new links in a network, the method comprising:
accessing network data from a data store, said network data including nodes and links, said nodes each having properties characterizing each node and said links each representing a connection between two of said nodes, said nodes and links comprising a network;
learning a classifier for predicting new links in said network, said learning including learning a Mahalanobis distance metric M for said network, said learning including applying one or more linear constraints on M, said constraints configured to enforce the structure of said network to be preserved in M;
receiving a link prediction request from a prediction requestor, said request indicating a target node having target properties;
predicting one or more new links for said target node responsive to said target node properties by applying a connectivity algorithm to said target node and said network nodes using said learned classifier including said learned distance metric M; and
transmitting said one or more predicted new links to said prediction requestor.

14. The method of claim 13, wherein said one or more linear constraints includes a constraint that for each of said nodes all connected nodes are closer than all unconnected nodes.

15. The method of claim 13, wherein said one or more linear constraints are enforced with slack.

16. The method of claim 13,
wherein learning a classifier for predicting new links in said network includes learning a degree preference function, said degree preference function being parameterized and non-stationary, and
wherein predicting one or more new links for said target node includes using said degree preference function to determine the number of said one or more new links to be predicted based on said target node properties.

17. The method of claim 16, wherein said learning a degree preference function includes enforcing a requirement that the resulting degree preference function for each node is concave.

18. The method of claim 13, wherein said connectivity algorithm is one of: maximum weight b-matching, k-nearest neighbors, $\epsilon$-neighborhoods, and maximum weight spanning tree.

19. The method of claim 13, wherein said learning includes applying a Frobenius norm regularizer on M.

20. The method of claim 13, wherein said target node is a new node joining said network.

* * * * *